(12) United States Patent
Duarte et al.

(10) Patent No.: US 7,071,916 B2
(45) Date of Patent: Jul. 4, 2006

(54) USER INPUT CONFIGURATIONS FOR A DATA PROCESSING DEVICE

(75) Inventors: Matias Duarte, San Francisco, CA (US); Andrew Zee, San Carlos, CA (US)

(73) Assignee: Danger, Inc., Palo Alto, CA (US)

( * ) Notice: Subject to any disclaimer, the term of this patent is extended or adjusted under 35 U.S.C. 154(b) by 393 days.

(21) Appl. No.: 10/718,739

(22) Filed: Nov. 21, 2003

(65) Prior Publication Data

US 2005/0068292 A1 Mar. 31, 2005

Related U.S. Application Data

(60) Provisional application No. 60/507,257, filed on Sep. 29, 2003.

(51) Int. Cl.
G09G 5/00 (2006.01)
G09G 5/08 (2006.01)

(52) U.S. Cl. ........................ 345/156; 345/157; 345/159; 345/169

(58) Field of Classification Search ........ 345/156–169, 345/173–179
See application file for complete search history.

(56) References Cited

U.S. PATENT DOCUMENTS

| | | | |
|---|---|---|---|
| 5,341,154 A | 8/1994 | Bird | |
| 6,353,529 B1 | 3/2002 | Cies | |
| 6,397,078 B1 | 5/2002 | Kim | |
| 6,483,455 B1 | 11/2002 | England | |
| 6,580,932 B1 * | 6/2003 | Finke-Anlauff | 455/566 |
| 6,947,028 B1 * | 9/2005 | Shkolnikov | 345/156 |
| 7,002,553 B1 * | 2/2006 | Shkolnikov | 345/169 |
| 2001/0048589 A1 | 12/2001 | Brandenbert et al. | |
| 2002/0086702 A1 | 7/2002 | Lai et al. | |
| 2002/0109965 A1 | 8/2002 | Horiki | |
| 2002/0149567 A1 * | 10/2002 | Griffin et al. | 345/169 |
| 2004/0185921 A1 | 9/2004 | Tornaghi | |
| 2004/0185922 A1 | 9/2004 | Sutton et al. | |
| 2004/0259599 A1 | 12/2004 | Okawa | |

* cited by examiner

*Primary Examiner*—Vijay Shankar
(74) *Attorney, Agent, or Firm*—Blakely, Sokoloff, Taylor & Zafman, LLP

(57) ABSTRACT

An apparatus is described comprising: a data processing device having a memory for storing program code and data and a processor for processing the program code and data, and a display for displaying graphical images and text; a control wheel rotatably and communicatively engaged with the data processing device, the control wheel causing a graphic element on the display to move in a first direction by a first predefined amount when rotated in a first direction and causing the graphic element to move in a second direction by the first predefined amount when rotated in a second direction; a first input button communicatively coupled to the data processing device and positioned directly adjacent to the control wheel in first direction; and a second input button communicatively coupled to the data processing device and positioned directly adjacent to the control wheel in the second direction, wherein the first input button, when selected, causes the graphic element to move in the first direction by a second predefined amount and wherein the second input button, when selected, causes the graphic element to move in the second direction by a second predefined amount.

28 Claims, 16 Drawing Sheets

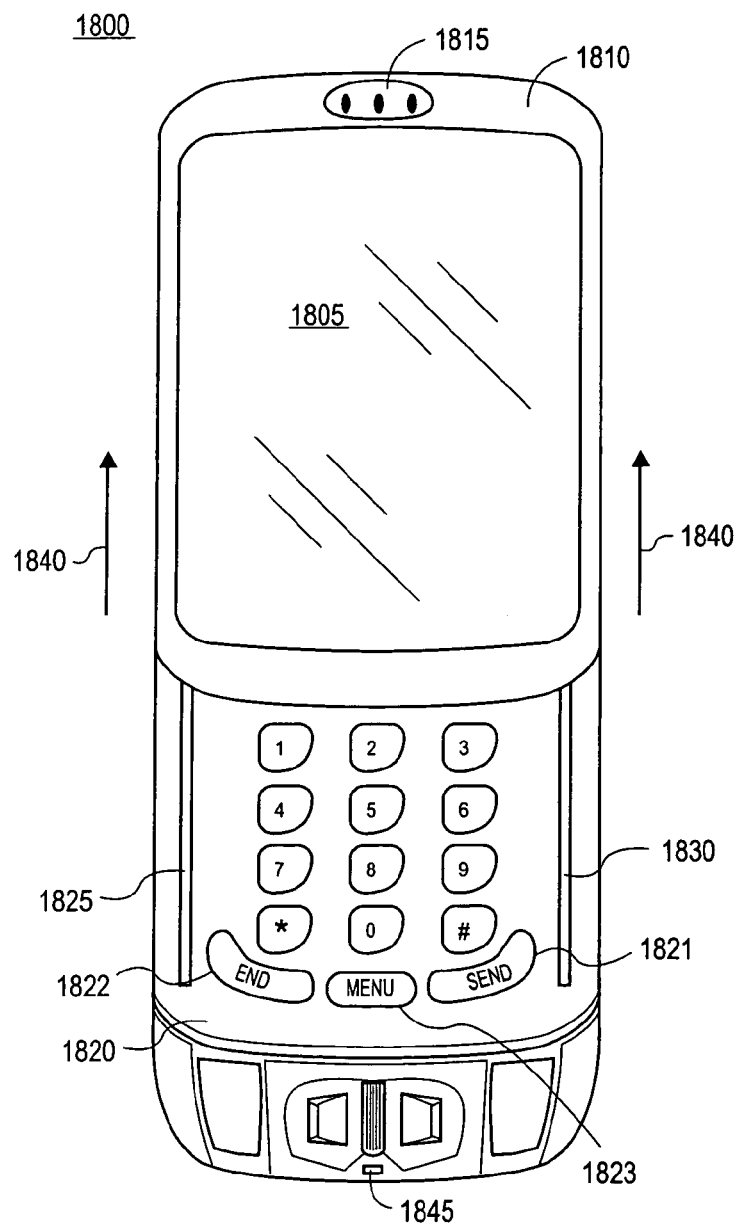
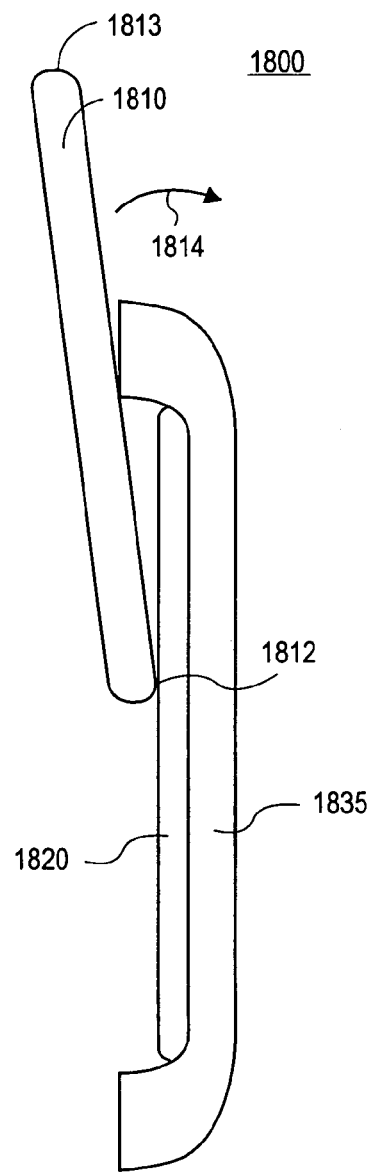
FIG. 18A
FIG. 18B

USER INPUT CONFIGURATIONS FOR A DATA PROCESSING DEVICE

PRIORITY

This application claims priority from the provisional application entitled DATA PROCESSING DEVICE HAVING MULTIPLE MODES AND MULTIPLE ASSOCIATED DISPLAY/KEYBOARD CONFIGURATION, Ser. No. 60/507,257, Filed Sep. 29, 2003.

BACKGROUND OF THE INVENTION

1. Field of the Invention

This invention relates generally to the field of data processing devices. More particularly, the invention relates to versatile input/output and display configurations for a data processing device.

2. Description of the Related Art

Portable data processing devices such as Personal Digital Assistants ("PDAs") and programmable wireless telephones are becoming more powerful every day, providing users with a wide range of applications previously only available on personal computers. At the same time, due to advances in silicon processing technology and battery technology, these devices may be manufactured using smaller and smaller form factors. Accordingly, users no longer need to sacrifice processing power for portability when selecting a personal data processing device.

Although processing devices with small form factors tend to be more portable, users may find it increasingly difficult to interact with them. For example, entering data may be difficult due to the absence of a full-sized keyboard and reading information may be difficult due to a small, potentially dim Liquid Crystal Display ("LCD").

To deal with this problem, devices have been produced which physically adjust to an "active" position when in use and an "inactive" position when not in use. For example, the well-known Motorola® Star-TAC® wireless telephone flips open when in use, thereby exposing a telephone keypad, a display and an earpiece. However, when this device retracts to an "inactive" position, the keypad, display, and earpiece are all completely inaccessible.

To solve these problems, the assignee of the present application developed a data processing device 100 with an adjustable display 103 as illustrated in FIGS. 1a–c. The data processing device 100 includes a keyboard 101, a control knob/wheel 102 (e.g., for scrolling between menu items and/or data), and a set of control buttons 105 (e.g., for selecting menu items and/or data).

The display 103 is pivotally coupled to the data processing device 100 and pivots around a pivot point 109, located within a pivot area 104, from a first position illustrated in FIG. 1a to a second position illustrated in FIGS. 1b–c. When in the first position the display 103 covers the keyboard 101, thereby decreasing the size of the device 100 and protecting the keyboard 101. Even when the display is in the first position, however, the control knob 102 and control buttons 105 are exposed and therefore accessible by the user. The motion of the display 103 from the first position to a second position is indicated by motion arrow 106 illustrated in FIGS. 1a–b. As illustrated, when in the second position, the keyboard 101 is fully exposed. Accordingly, the display is viewable, and data is accessible by the user in both a the first position and the second position (although access to the keyboard is only provided in the first position).

In one embodiment, the data processing device 100 is also provided with audio telephony (e.g., cellular) capabilities. To support audio telephony functions, the embodiment illustrated in FIGS. 1a–c includes a speaker 120 for listening and a microphone 121 for speaking during a telephone conversation. Notably, the speaker 120 and microphone 121 are positioned at opposite ends of the data processing device 100 and are accessible when the screen 103 is in a closed position and an open position.

SUMMARY

An apparatus is described comprising: a data processing device having a memory for storing program code and data and a processor for processing the program code and data, and a display for displaying graphical images and text; a control wheel rotatably and communicatively engaged with the data processing device, the control wheel causing a graphic element on the display to move in a first direction by a first predefined amount when rotated in a first direction and causing the graphic element to move in a second direction by the first predefined amount when rotated in a second direction; a first input button communicatively coupled to the data processing device and positioned directly adjacent to the control wheel in first direction; and a second input button communicatively coupled to the data processing device and positioned directly adjacent to the control wheel in the second direction, wherein the first input button, when selected, causes the graphic element to move in the first direction by a second predefined amount and wherein the second input button, when selected, causes the graphic element to move in the second direction by a second predefined amount.

BRIEF DESCRIPTION OF THE DRAWINGS

A better understanding of the present invention can be obtained from the following detailed description in conjunction with the following drawings, in which:

FIGS. 18a–b, 19 and 20 illustrate embodiments of the invention which includes a moveable numeric keypad integrated between a moveable display and a data processing device.

DETAILED DESCRIPTION OF PREFERRED EMBODIMENTS

In the following description, for the purposes of explanation, numerous specific details are set forth in order to provide a thorough understanding of the present invention. It will be apparent, however, to one skilled in the art that the present invention may be practiced without some of these specific details. In other instances, well-known structures and devices are shown in block diagram form to avoid obscuring the underlying principles of the present invention.

Several different multi-purpose input/output and display configurations for a data processing device are described below. As will be apparent from the following description, many of these configurations are particularly beneficial when employed on a dual-purpose data processing device such as a personal digital assistant ("PDA") or other mobile computing device having integrated wireless telephony capabilities (e.g., a combination PDA and cell phone). However, it should be noted that the underlying principles of the invention are not limited to wireless telephony configuration.

Figure 2:
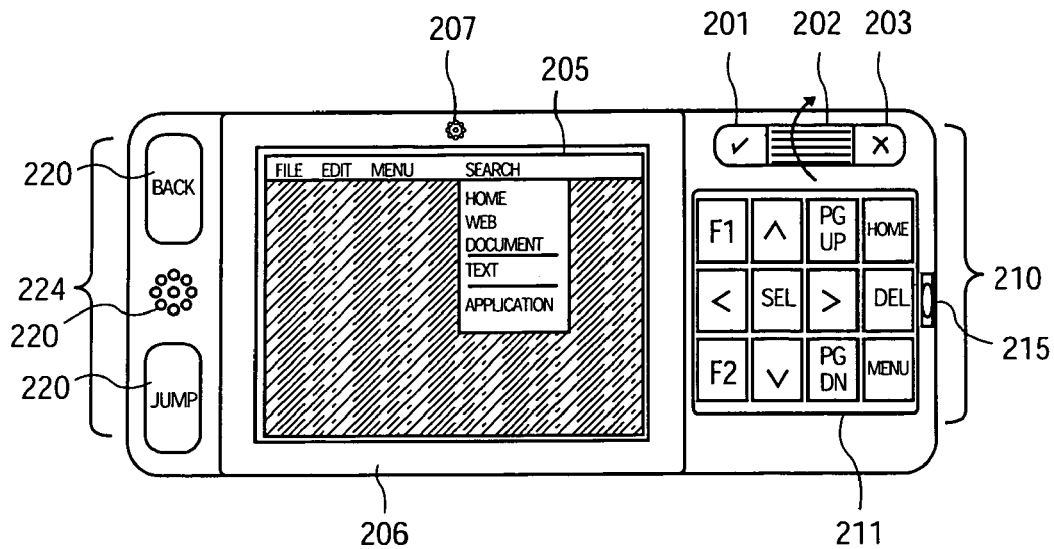
FIG. 2 illustrates one embodiment of a data processing device in a first orientation and/or operating mode.
Figure 3:
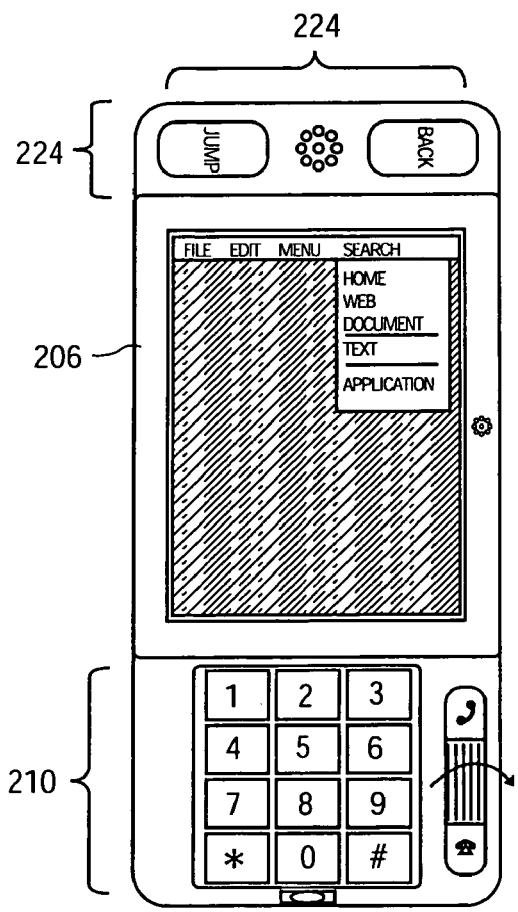
FIG. 3 illustrates an embodiment of a data processing device in a second orientation and/or operating mode.
Figure 4:
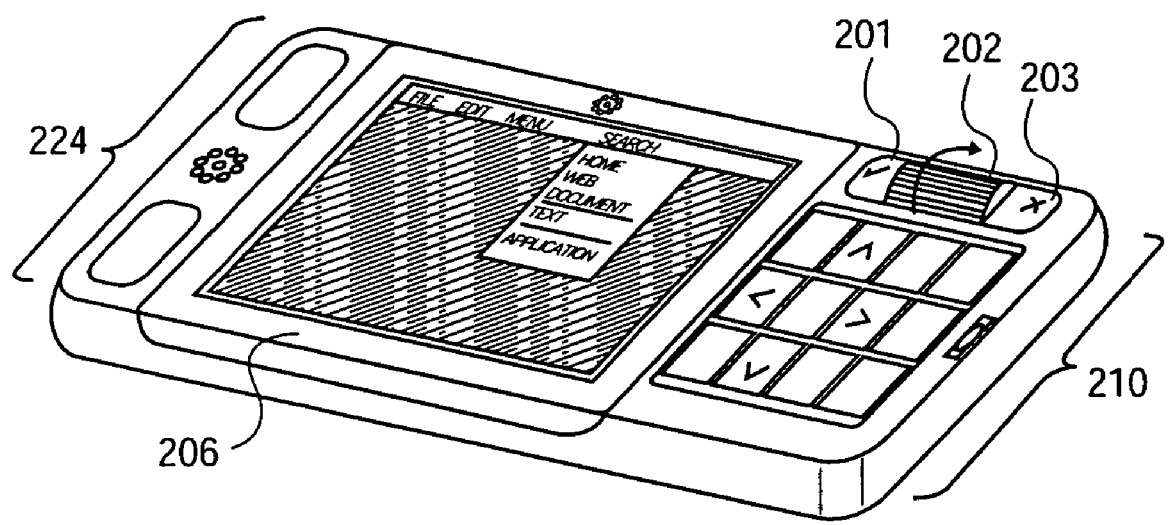
FIG. 4 illustrates an embodiment of the data processing device from a perspective view.

A data processing device 200 according to one embodiment of the invention is illustrated in FIGS. 2–4. The data processing device 200 includes a display 206 with a viewable display area 205 for displaying various types of text and graphics (e.g., graphical navigation menus, email messages, electronic calendars, electronic address books, . . . etc). In one embodiment, the display is a backlit or reflective thin film transistor ("TFT") display. In another embodiment, the display is a transflective SuperTwisted Nematican ("STN") display. However, the underlying principles of the invention are not limited to a particular display type.

In one embodiment, the data processing device 200 includes two or more different modes of operation which may be associated with two or more operational orientations. In the first mode of operation, the display 206 is viewed in a first orientation, illustrated generally in FIG. 2 (i.e., images are displayed upright on the display when the device is oriented as shown in FIG. 2). By contrast, in the second mode of operation, the display 206 is viewed in a second orientation, illustrated generally in FIG. 3 (i.e., images are displayed upright on the display when the device is oriented as shown in FIG. 3).

In one embodiment, the data processing device 200 includes a first set of control elements 210 positioned to the right of the display 206 and a second set of control elements 224 positioned to the left of the display (i.e., to the "left" and "right," respectively, in the first orientation illustrated in FIG. 2). Thus, in the first operational mode, the first set of control elements 210 are readily accessible by a user's right hand and the second set of control elements 224 are readily accessible by a user's left hand. As used herein, the term "control elements" means any type of data input or control mechanism associated with the data processing device 200 including, by way of example and not limitation, data entry keys such as alphanumeric keys, knobs, scroll wheels, or buttons. As will be described in greater detail below, in one embodiment, the various control elements configured on the data processing device 200 may perform different operations in the different operational modes.

In one embodiment, the first set of control elements 210 includes a control wheel 202 positioned between two control buttons 201 and 203, as illustrated. Various different types of control wheels 202 and control buttons 201 and 203 may be employed such as those currently used on the Blackberry™ line of wireless messaging devices from Research In Motion. The control wheel 202 may be used to move a cursor device, highlight bar or other selection graphic on the display 205 to select menu items, program icons and other graphical or textual display elements. In the embodiment shown in FIG. 2 the first button 201 is configured to select graphical/textual items highlighted on the display screen 205 (as indicated by the check mark), and the second button 203 is configured to de-select items and/or to "back" out of a current application, menu, icon, . . . etc (as indicated by the X mark). Alternatively, or in addition (i.e., depending on the selected mode of operation), the "X" may cancel actions and return to the previous screen, and the check mark may save actions and return to the previous screen. By way of example, if the email application is open, "X" may cancel the composition of a new message, whereas the check mark may send or save a message that has been composed.

By way of example, and not limitation, if an email client application is executed on the device 200, the control wheel 202 may be configured to scroll through the list of email messages within the user's inbox (e.g., with the current email message highlighted on the display 205). The first control button 201 may be configured to select a particular email message within the list and the second control button 203 may be configured as a "back" button, allowing the user to back out of selected email messages and/or to move up through the menu/folder hierarchy. Of course, the underlying principles of the invention are not limited to any particular configuration for the control wheel 202 or control buttons 201, 203.

The second set of control elements 210 also includes a keypad 211 for performing various additional control and/or input functions. In one embodiment, the keys of the keypad 211 are configured to perform different input/control operations depending on whether the data processing device 200 is in the first mode/orientation (FIG. 2) or the second mode/orientation (FIG. 3). In addition, as will be described in greater detail below, in one embodiment, a first series of glyphs are highlighted on the keys 211 when the data processing device 200 is in the first mode and a second series of glyphs are highlighted on the keys 211 when the data processing device is in the second mode. Various mechanisms for highlighting a particular set of glyphs may be employed (as described below).

When in the first operational mode, the keypad 211 includes a series of cursor control keys to move a cursor up, down, left, and right, as indicated by the "^," "v," "<" and ">" glyph pointers, respectively, on four of the keys of the keypad 211 illustrated in FIG. 2. The keypad 211 also includes "page up" and "page down" keys (e.g., configured to perform typical page up/down functions); a "delete" key for deleting text characters; and a "home" key for jumping to the data processing device's main menu, or performing application-specific functions typically associated with a "home" key (e.g., moving a cursor to the beginning of a line in a word processing document). A "menu" key is also provided which generates a context-specific menu when selected (e.g., a different menu may be generated based on which application is currently running). Various alternate and/or additional keys may be included within the keypad 211 while still complying with the underlying principles of the invention. In addition, two functions keys are provided, F1 and F2, which may be programmed by the end user to perform designated operations (e.g., opening a particular application, jumping to a particular file folder, . . . etc).

Of course, the particular keypad layout illustrated in FIG. 2 is not required for complying with the underlying principles of the invention. For example, alternate configurations could provide "Home" and "Menu" functions on the left hand side of the device, and additional functions like "Back" on the right hand side in the area shared by the keypad. It's also notable that the scroll wheel may be eliminated entirely as the "21 ," ">," "v" and "^" keys are sufficient for making selections and highlighting onscreen items.

The second set of control elements 224 illustrated in FIG. 2 includes a "jump" button 226 which allows a user to jump to designated applications and/or points within the graphical menu/folder hierarchy. For example, the user may jump to a specified application by selecting the "jump" button and one of the keys within the keypad 211. The second set of control elements 224 also includes a "back" button 226, allowing the user to back out of selected applications or points within the menu/folder hierarchy. Once again, various additional functions/keys may be included within the second set of control elements 224 while still complying with the underlying principles of the invention.

As mentioned above, in one embodiment, the data processing device 200 includes an integrated telephone with a wireless transceiver for transmitting/receiving audio signals over a wireless telephony network (e.g., a Global System for Mobile Communications (GSM) network or other type of cellular network). As such, in this embodiment, the data processing device 200 is equipped with a telephony input/output port designed to interface with a "hands-free" headset and microphone. In addition, as illustrated, one embodiment of the data processing device 200 includes a speaker 220 at one end and a microphone 215 at the other end, to provide telephony capabilities without a separate headset and/or microphone.

In one embodiment, the functions associated with the various control elements are automatically modified when the data processing device 200 is switched between the first and second operational modes. Specifically, in the embodiment shown in FIG. 3, the keys of the keypad 211 within first set of control elements 210 are converted from the data entry functions described above to a numeric keypad. As illustrated, the glyphs on the face of each of the keys of the keypad change, both in content and in orientation, to reflect the associated change in function and orientation of the data processing device 200. The numeric keypad functions are particularly suitable when the data processing device 200 is used as a telephone. Thus, in one embodiment, the second mode is a "telephony mode" in which the data processing device operates as a telephone and in which the user may enter a telephone number and perform other telephony-based functions via the numeric keypad 211.

In addition, when in the second mode, the functions performed by the control wheel 202 and control buttons 201 and 203 may be automatically modified. For example, if the second mode is a "telephony mode" as described above, the first control button 201 may be used to initiate and answer calls and the second control button 203 may be used to terminate calls. Moreover, in one embodiment, the control wheel may be used to navigate through telephony-based menus such as the user's stored telephone numbers and the telephone menu structure.

In one embodiment, applications, menus and/or user interface features may also be modified to reflect the switch between the first operational mode/orientation and the second operational mode/orientation. For example, when in the first mode of operation, a more advanced user interface may be triggered which is navigable via the first and second sets of control elements 224 and 210, respectively. By contrast, when in the second mode of operation, a user interface may be provided which is more easily navigable with the limited control functions provided by the control wheel 202, control buttons 201 and 202, and numeric keypad 211. Moreover, telephony-specific applications may be automatically made available or launched when the data processing device 200 is in the second mode (i.e., assuming that the second mode is a "telephony" mode), whereas a more general set of applications may be made available to the user when the data processing device 200 is in the first mode.

In addition, as illustrated generally in FIGS. 2 and 3, in one embodiment, when switching between the first mode and the second mode, the orientation of images and/or text on the display screen 205 will change. For example, in the first mode, images/text are displayed right-side-up when the device is oriented as shown in FIG. 2. By contrast, when in the second mode, images are displayed right-side-up when the device is oriented as shown in FIG. 3 (i.e., the images are rotated 90 degrees with respect to the orientation shown in FIG. 2). In one embodiment, the specific image orientation to be used for each operating mode may be selected by the end user.

Switching between the first and second operational modes may occur automatically and/or manually. For example, in one embodiment, selecting a designated key or sequence of keys may cause the data processing device 200 to switch between modes (e.g., simultaneously pressing the "back" and "menu" buttons). Alternatively, or in addition, the data processing device 200 may automatically switch between modes based on the specific operations or applications selected by the user (e.g., as described in greater detail below with respect to FIG. 15). For example, if the device is in the first mode and the user selects a telephony-based application from the main menu (e.g., a list of stored telephone numbers) the data processing device 200 will automatically switch to the telephony mode 200.

In one embodiment, motion sensors (not shown) are configured within the data processing device 200 to detect its orientation, and responsively generate control signals identifying its orientation. In response to the control signals, the data processing device 200 then switches between the first and second modes of operation. Various alternate mechanical or logical (e.g., software/hardware) triggers may be employed to switch between the first and second operational modes. Alternate logical mechanisms may include, for example, non-user-initiated software choices such as receiving a phone call, or having a calendar event set up to remind the user to hold a conference call. Alternative mechanical triggers may include, for example, a slide switch which is comfortable to access in either operation mode and which hides/reveals symbols indicating which mode is active, or an illuminated push button switch which toggles between the two modes and illuminates symbols indicating which is the active mode.

In one embodiment, illustrated in FIGS. 5–8, an alphanumeric keyboard 500 (e.g., a QWERTY keyboard) is configured on/within the data processing device 200. In this embodiment, the display 206 is configured to rotate around a pivot point 207 from a first position, in which it covers the alphanumeric keyboard 500 (as it does in FIGS. 2–4), to a second position, in which it exposes the alphanumeric keyboard 500 (illustrated fully-exposed in FIGS. 7 and 8).

Figure 1A:
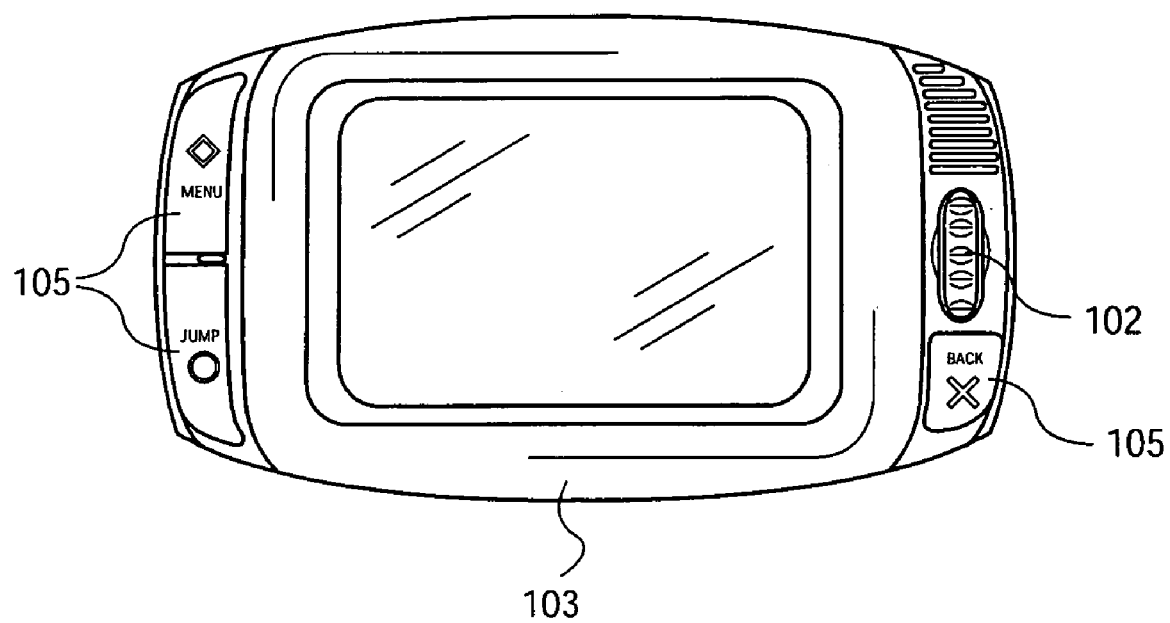
FIGS. 1a–c illustrate a prior art data processing device with an adjustable display.
Figures 1B, 1C:
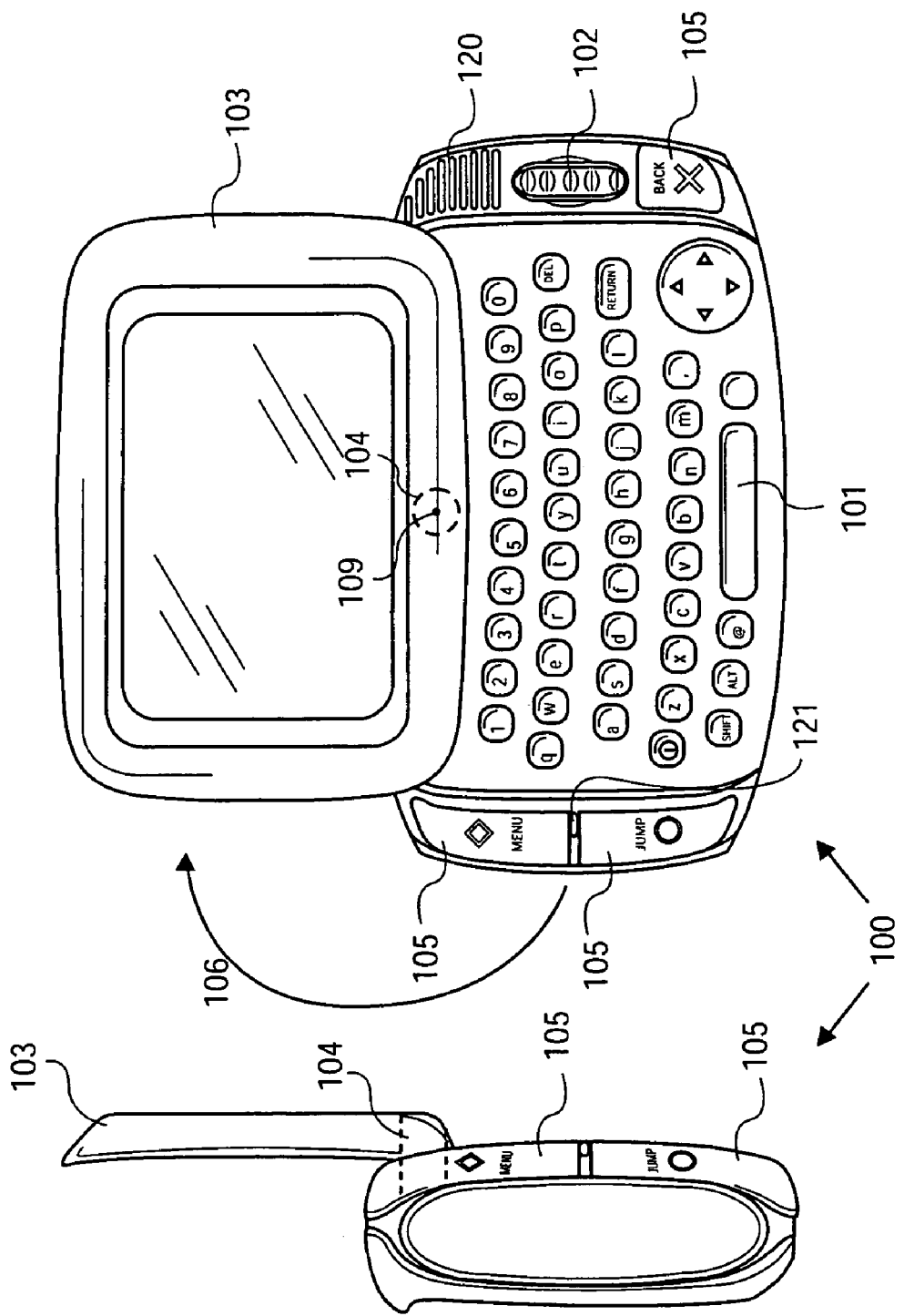
Figure 5:
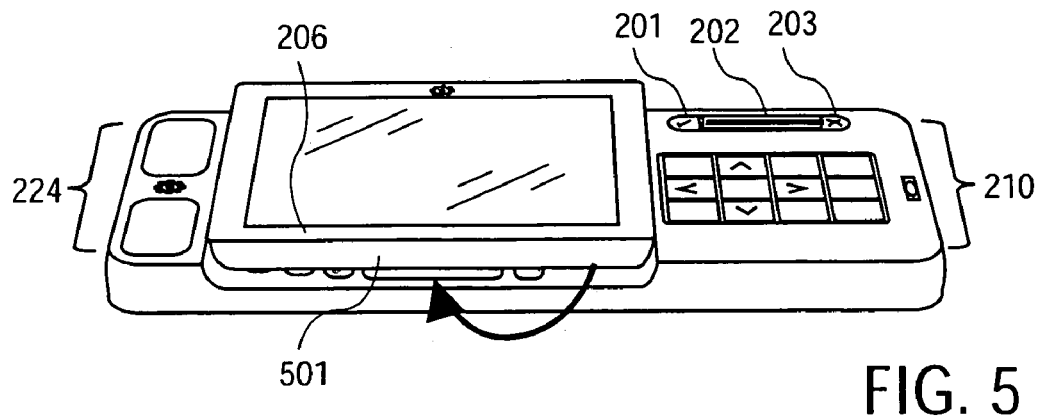
FIGS. 5–7 illustrate one embodiment of the data processing device which includes an adjustable display.

In one embodiment, the display 206 rotates from the first position to the second position within a plane defined by the display 206 (e.g., as does the data processing device illustrated in FIGS. 1*a*–*c*). Alternatively, as illustrated in FIG. 5, in one embodiment, the front edge 501 of the display 206 initially lifts upward as illustrated in FIG. 5, creating an angle between the plane defined by the data processing device 200 and the plane defined by the display 206. To aid the user in lifting the display, in one embodiment, a small nub 502 is formed on the non-viewable portion of the display (e.g., providing a protruding surface for engaging with the user's thumb).

Figure 6:
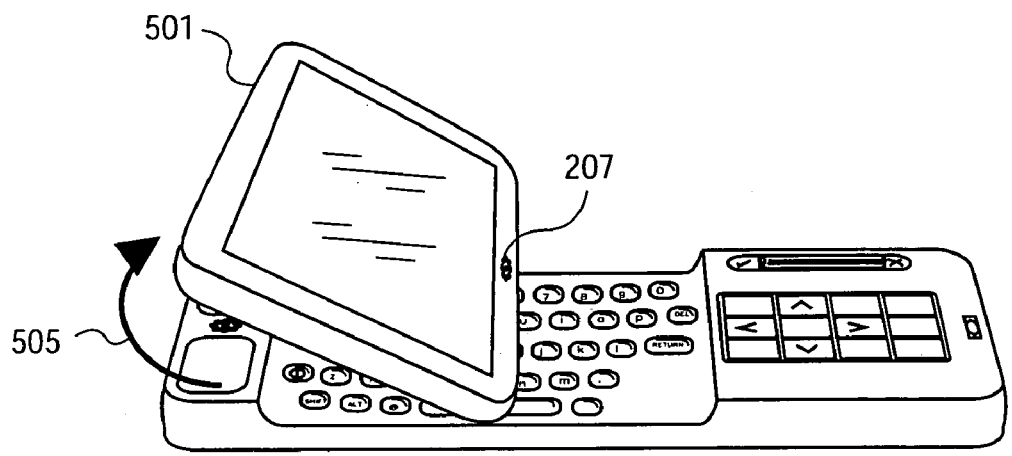
Figure 7:
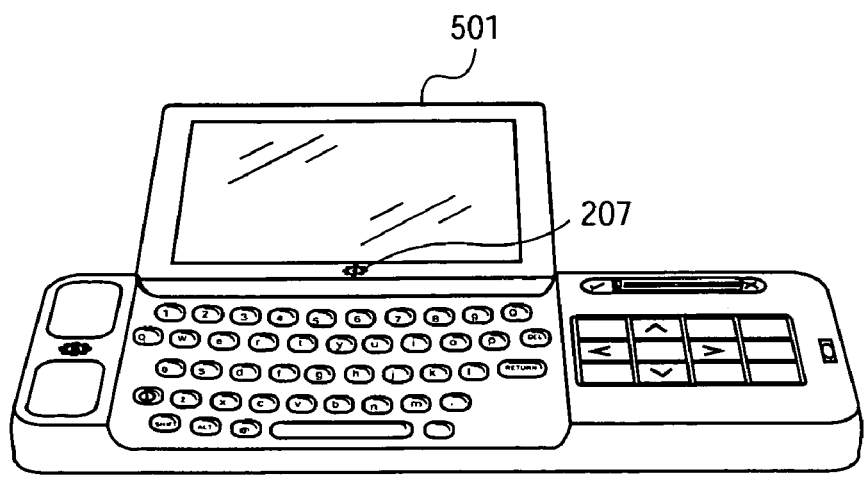
Figure 8:
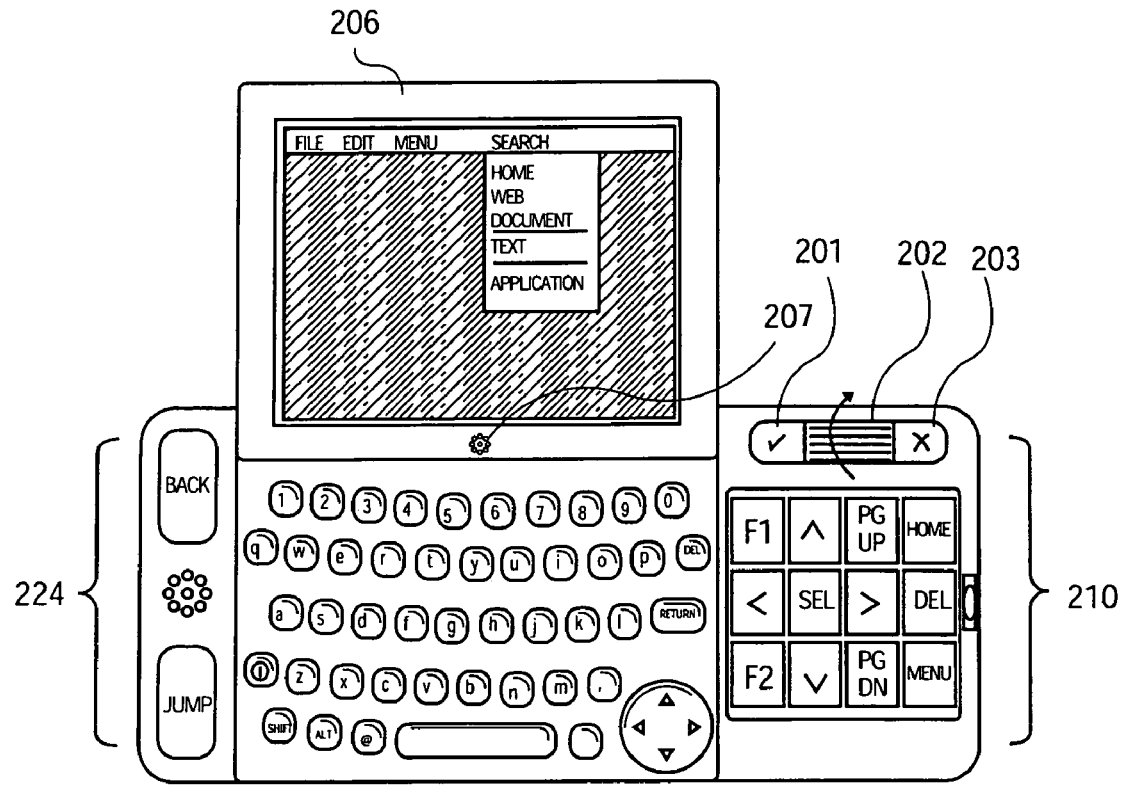
FIG. 8 illustrates one embodiment of the data processing device from a top view in which the display is rotated to expose a keyboard.

Once elevated, the display 206 rotates around the pivot point 207 to the second position shown in FIG. 7 from a front perspective view and FIG. 8 from a top view. In one embodiment, rather than initially lifting up as illustrated in FIG. 5, the display will lift upward as it rotates from the first position to the second position. FIG. 6 illustrates the display elevated and rotated halfway between the first position and the second position. A rotation arrow 505 is provided to indicate the rotation of the display 206.

Figure 9:
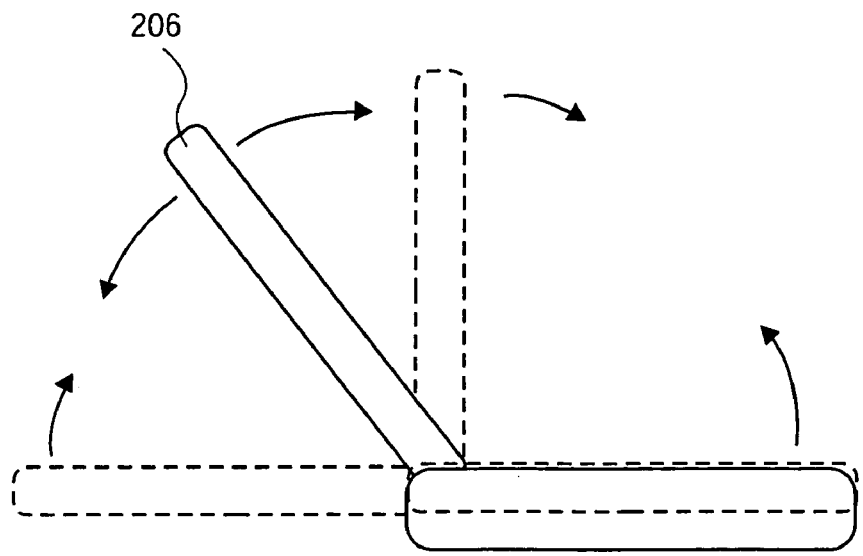
FIG. 9 illustrates movement of the display according to one embodiment of the invention.

The display 206 may lift upward at various different angles in relation to the data processing device 200 (e.g., 7 deg, 15 deg, 25 deg, . . . etc), both prior to rotating to the second position and/or after it has reached to the second position. As illustrated in FIG. 9, in one embodiment, the display 206 is adjustable at a variety of different angles with respect to the data processing device 200, both from the first position and/or the second position. Of course the display may open from no angle when in the first position to a fixed angle while in the second position while still complying with the underlying principles of the invention.

In one embodiment, the display 206 may be closed over the alphanumeric keyboard 500 from the second position, with the display screen 205 facing the keyboard 500, thereby exposing the back of the display and protecting both the display screen 205 and the keyboard 500. This configuration may be particularly useful when the data processing device 200 is stored away for travel (e.g., stored within a suitcase or pocketbook).

In one embodiment, the display 206 initially rotates within a plane defined by the display from the first position to the second position as described above. Then, when the display is in the second position the angle between the display 206 and the data processing device 200 may be adjusted, as described above with respect to FIG. 9.

As illustrated in FIGS. 2–8, the display 206 is viewable regardless of whether it is in the first position or the second position (i.e., unless it is closed with the display screen 205 facing the keyboard 500 as described above). When in the first position, the display 206 covers the keyboard 500 thereby decreasing the size of the data processing device 200 and protecting the keyboard 500. Even when the display 206 is in the first position, however, the first and second sets of control elements 210 and 224, respectively, are exposed and therefore accessible by the user. When in the second position, the alphanumeric keyboard 500 is fully exposed, providing for fully-functional data entry (e.g., composing of an email message).

In one embodiment, the second position of the display 206 represents a third operational mode/orientation for the device 200. Thus, when the data processing device 200 switches from the first or second operational modes described above to the third operational mode, different menus, applications and/or other user interface features may be activated. For example, when the device enters the third mode of operation, user interface features associated with applications may change to reflect the availability of the alphanumeric keyboard 500 (e.g., more advanced text-based data entry capabilities may be provided allowing users to enter text directly within the body of email messages or word processing documents).

Figure 10:
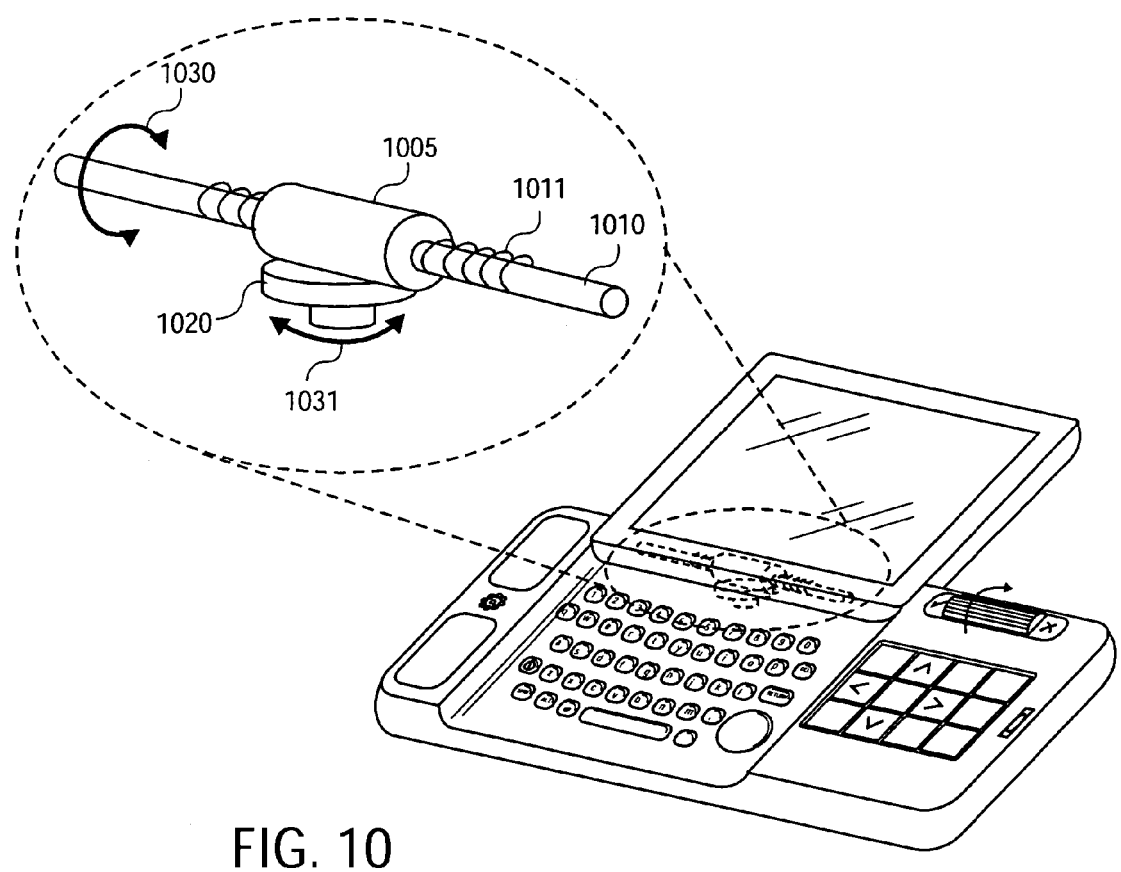
FIG. 10 illustrates one embodiment of a mechanism for coupling an adjustable display on a data processing device.
Figure 11:
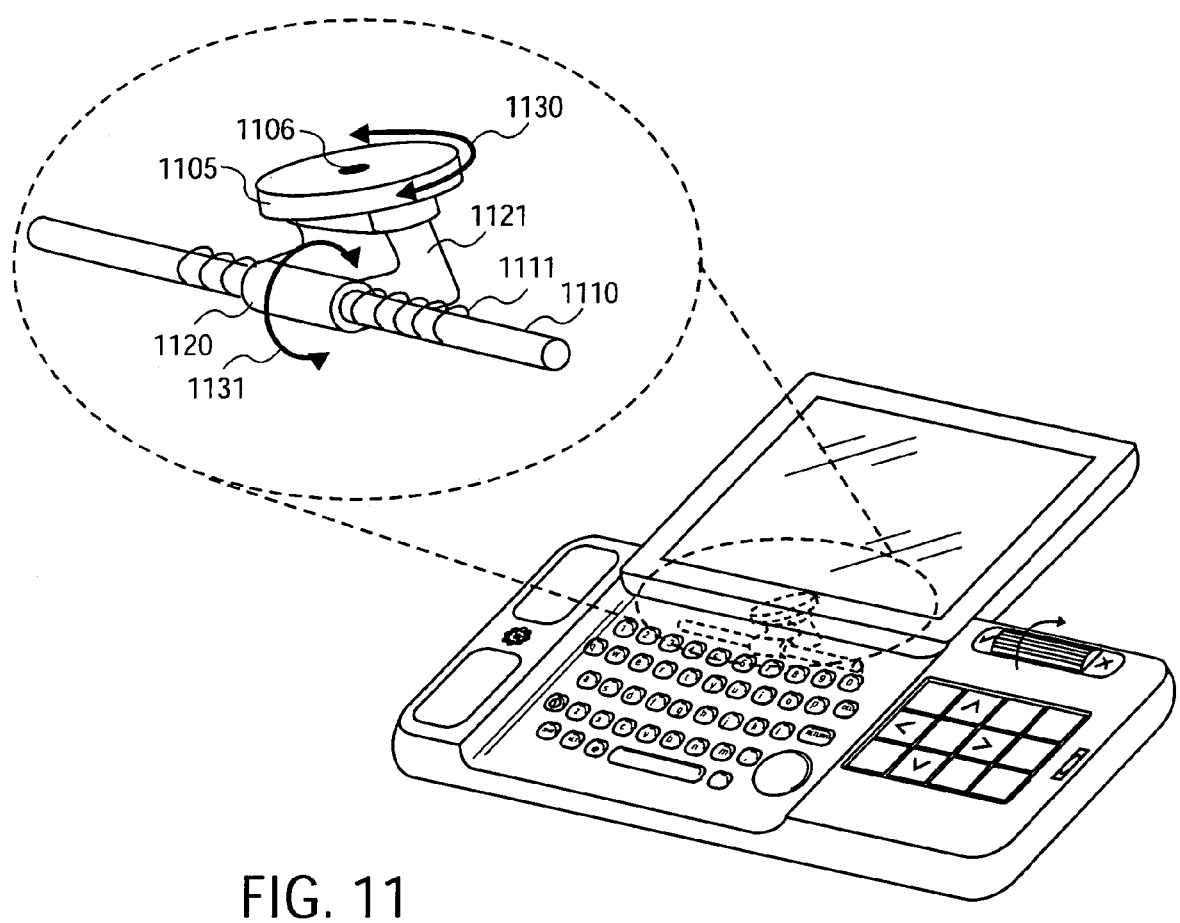
FIG. 11 illustrates a second embodiment of a mechanism for coupling an adjustable display to a data processing device.

Two different mechanisms for enabling the motion of the display 206 as shown in FIGS. 5–7 are illustrated in FIGS. 10 and 11. The mechanism illustrated in FIG. 10 includes a cylindrical chamber 1005 fixedly attached to a rotation element 1020. A pin 1010 rotates within the chamber as indicated by rotation arrow 1030. The pin is coupled to the display 206 and rotates in response to upward or downward forces applied on the edge of the display 206, causing the edge of the display 206 to move upward or downward with respect the data processing device 200 as illustrated in FIG. 9. A torsion spring 1011 cooperatively mated with both the pin 1010 and the chamber 1005 generates a torque on the pin 1011 which holds the pin, and therefore the display 206, in place when it is not being manipulated by the user (e.g., to counteract gravity and hold the display 206 in a position such as that shown in FIG. 7). Of course, various other well known techniques may be employed to hold the display in place (e.g., using springs and/or friction).

The rotation element 1020 is rotatably coupled to the data processing device 200. For example, a pin formed on/within the data processing device 200 may fit within a cylindrical chamber located on the underside of the rotation element 1020, allowing the rotation element 1020 to rotate in the manner indicated by rotation arrow 1031. The rotation of rotation element 1020 allows the display 206 to rotate from the first position illustrated in FIGS. 2–4 (in which the keyboard 500 is covered) to the second position illustrated in FIGS. 7 and 8 (in which the keyboard 500 is exposed). Once again, various different types of rotational mechanisms may be employed to allow the screen to rotate while still complying with the underlying principles of the invention.

FIG. 11 illustrates another embodiment for enabling the motion of the display 206. This embodiment includes a first connection element 1105 which is fixedly coupled to the non-viewable side of the display 206. The first connection element is rotatably coupled to an arm 1121 and rotates around a rotation point 1106 as indicated by rotation arrow 1130. The arm 1121 is fixedly coupled to a cylindrical element 1120 which rotates around an axis defined by a pin 1110. The pin 1110 is inserted through a cylindrical chamber within the cylindrical element 1120. As in the prior embodiment, a torsion spring 1111 may be coupled to the pin 1110 and the chamber 1120 to hold the chamber 1120 and therefore the display 206 in an elevated orientation.

As mentioned above, different glyphs on the control elements 210 and 224 may by highlighted to identify different functions, based on the operational mode of the data processing device 200 (e.g., based on whether the data processing device 200 is in the "first," "second" or "third" operational modes described herein). Similarly, different glyphs on the alphanumeric keyboard 500 may by highlighted based on the mode of operation and/or user-selected functions. For example, if a first set of functions for standard alphanumeric input (e.g., standard alphanumeric characters) are enabled, glyphs associated with the first set of functions (e.g., glyphs representing the alphabet) are highlighted. In one embodiment, a second and third set of functions may be enabled by the user by holding down an ALT or CTRL key, as with a standard QWERTY keyboard. In this embodiment, different glyphs representing the different functions associated with the keys of the keyboard 500 may be highlighted. For example, if the combination of the CRTL key and the X key (i.e., X when used for standard alphanumeric input) cuts text from a document then, upon selecting the CTRL key, the glyph "CUT" or a different symbol representing the "cut" function (e.g., a pair of scissors) may be highlighted on the key instead of the glyph "X." Of course, the underlying principles of the invention are not limited to any particular set of key combinations or functions.

Figure 12:
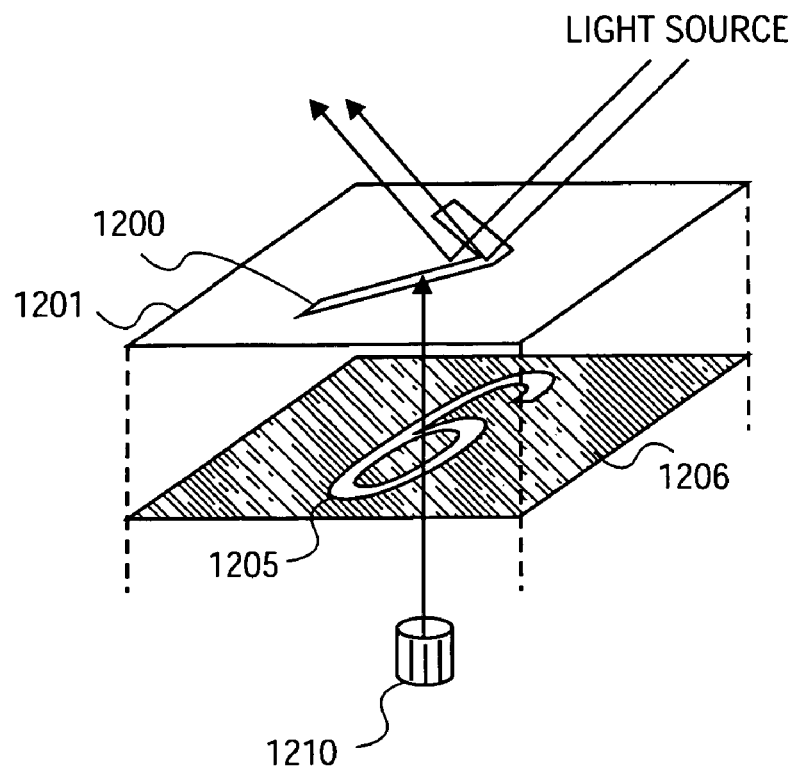
FIG. 12 illustrates a manner for highlighting glyphs according to one embodiment of the invention.

Various techniques may be employed to highlight the different glyphs associated with each key within the keyboard 500 and/or control element 210, 224. For example, as illustrated in FIG. 12, in one embodiment, a first glyph 1200 is printed on the face of each key 1201 with a relatively subtle coloring in relation to the color of the key (e.g., a dark gray glyph printed on a light gray key). In one embodiment, the surface of the key and/or the glyph is comprised of a silvered reflective material which reflects light incident upon the surface 1201 from an external light source. Various different types of reflective surfaces may be used for the face of the key 1201 and/or glyph 1200. In one embodiment, when the data processing device 200 is in a first mode of operation associated with the first glyph 1200, the light reflected off of the reflective surface 1201 reveals the glyph 1200 because of the different coloring of the glyph 1200 in relation to the remainder of the surface 1201.

It should be noted that a "silvered reflective material" is not strictly necessary for implementing the multiple glyph features described above. For example, any type of material which reflects sufficient light to hide its internal structure may be employed while still complying with the underlying principles of the invention. This may include, for example, a think coat of a light colored paint, or a fully transparent plastic with enough surface texture to diffuse the light (e.g., and give it a frosted appearance).

In addition, as illustrated in FIG. 12, a second glyph 1205 is formed on a second surface 1206 beneath the first surface 1201. In one embodiment, the second glyph 1205 is formed from a translucent or transparent material (e.g., transparent plastic) whereas the remainder of the surface 1206 is opaque. An LED 1210 is positioned beneath the second glyph 1205 and the second surface 1206. In one embodiment, when the data processing device 200 is in a second mode of operation associated with the second glyph 1205 (e.g., turning the keypad into a numeric keypad illustrated in FIG. 3), the LED 1210 generates light from underneath the second surface 1206 and second glyph 1205. The light passes through the transparent or translucent second glyph 1205 and is blocked by the remainder of the second surface 1206, thereby highlighting the second glyph 1205. The light generated by the LED 1210 is of a high enough intensity so that it will pass through the first surface 1201 and glyph 1200, thereby illuminating the second glyph 1205 for the user 1205. As described above, the first surface 1201 and first glyph 1200 reflect light incident from outside of the key (as indicated in FIG. 12). However, in one embodiment, the first surface 1201 and first glyph 1200 are semi-transparent or semi-translucent with respect to light generated from beneath the key or inside of the key (e.g., from the LED 1210 illustrated in FIG. 12).

Figure 13:
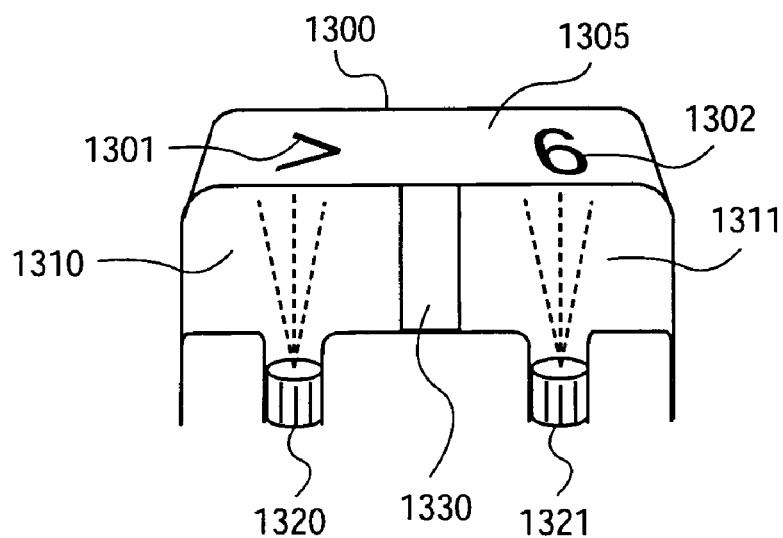
FIG. 13 illustrates a manner for highlighting glyphs according to another embodiment of the invention.

In another embodiment, separate LEDs are configured to illuminate each glyph. By way of example, FIG. 13 illustrates a key 1300 with an opaque top surface 1305 and two translucent/transparent glyphs 1301 and 1302. A separate illumination chamber, 1310 and 1311, is provided underneath each glyph, 1301 and 1302, respectively. The chambers 1310 and 1311 are separated by an opaque divider 1330. A first LED 1320 is configured within the first chamber 1310 to provide light to illuminate the first glyph 1301 and a second LED 1321 is configured within the second chamber 1311 to provide light to illuminate the second glyph 1302. In one embodiment, the different LED's are enabled and/or disabled based on the current operational mode selected on the data processing device 200. For example, the first LED 1320 may be illuminated for the first operational mode and the second LED 1321 may be illuminated for the second operational mode.

In another embodiment, the same illumination chamber may be shared between different glyphs. In this embodiment, the contrast between glyphs may be controlled by adjusting the color of the light generated by the different LEDs. Once particular implementation for illuminating glyphs is described in the co-pending application entitled "A METHOD OF DYNAMICALLY LIGHTING KEYBOARD GLYPHS," Filed Aug. 17, 2001, Ser. No. 09/932,195, which is assigned to the assignee of the present application and which is incorporated herein by reference. One embodiment described in this co-pending application adjusts contrast between glyphs by selecting LED colors which are complimentary to the colors of certain glyphs. For example, if an LED color is selected which is complementary to the color of a glyph, that glyph will absorb the complimentary light and will appear dark in relation to the other glyphs. Various alternate and/or additional techniques for highlighting glyphs may be employed while still complying with the underlying principles of the invention.

Figure 14:
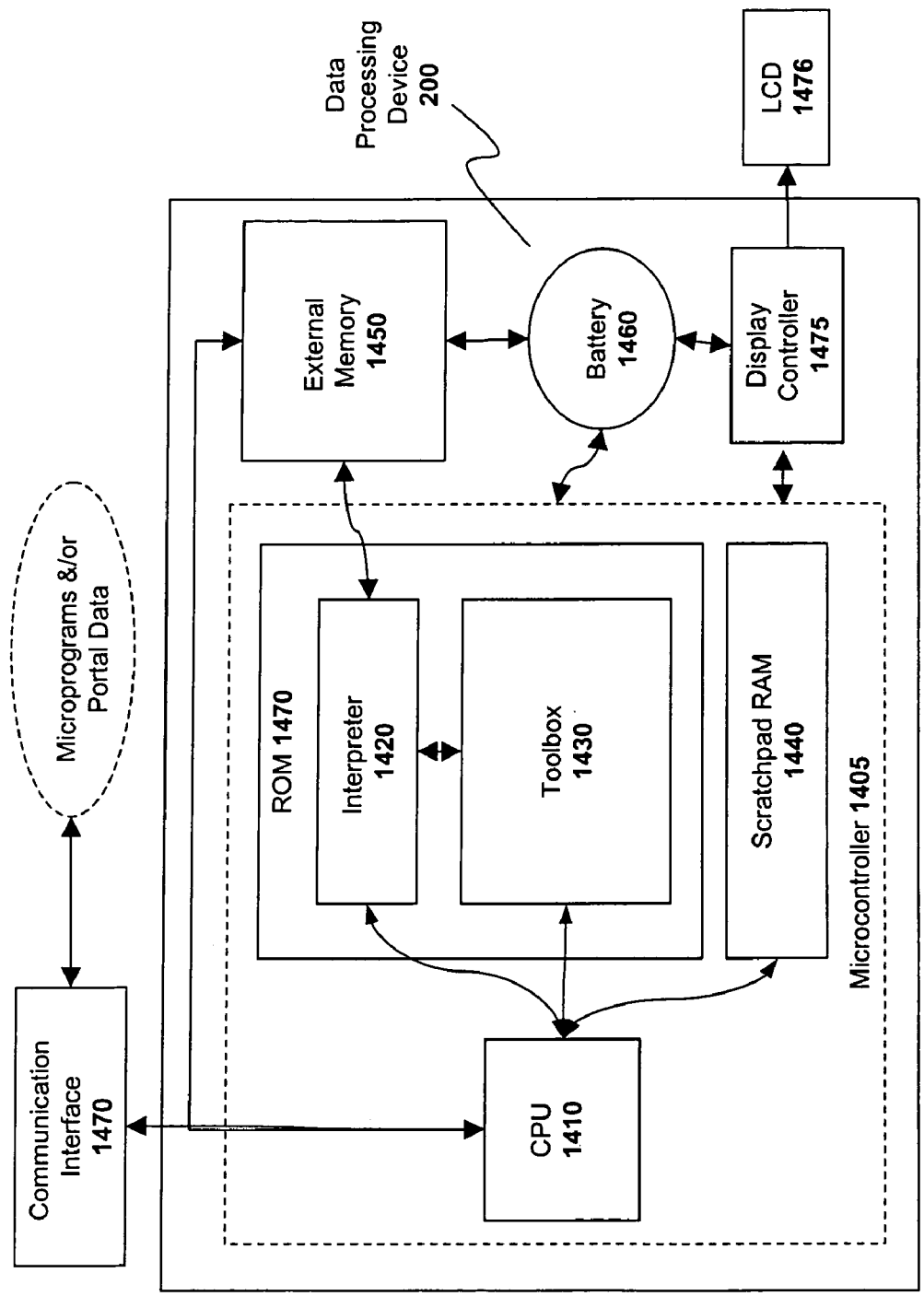
FIG. 14 illustrates a hardware architecture employed in one embodiment of the invention.

One embodiment of a data processing device architecture is illustrated in FIG. 14. It should be noted, however, that the underlying principles of the invention are not limited to any particular device architecture. In fact, the underlying principles of the invention may be implemented on virtually any data processing device capable of processing data and displaying text and graphics.

The particular embodiment illustrated in FIG. 14 is comprised of a microcontroller 1405, an external memory 1450, a display controller 1475, and a battery 1460. The external memory 1450 may be used to store programs and/or data 1465 transmitted to the data processing device 200 over a network (now shown). In one embodiment, the external memory 1450 is non-volatile memory (e.g., an electrically erasable programmable read only memory ("EEPROM"); a programmable read only memory ("PROM"), . . . etc). Alternatively, the memory 1450 may be a volatile memory (e.g., random access memory or "RAM") but the data stored therein may be continually maintained via the battery 1460. The battery 1460 in one embodiment is a coin cell battery such as those used in calculators and watches.

The microcontroller 1405 of one embodiment is comprised of a central processing unit ("CPU") 1410, a read only memory ("ROM") 1470, and a scratchpad RAM 1440. The ROM 1470 is further comprised of an interpreter module 1420 and a toolbox module 1430.

The toolbox module 1430 of the ROM 1470 contains a set of toolbox routines for processing data, text and graphics on the device 100. These routines include drawing text and graphics on the device's display 430, decompressing data transmitted from the portal server 110, reproducing audio on the device 100, and performing various input/output and communication functions (e.g., transmitting/receiving data over the client link 160 and/or the RF link 220). A variety of additional device functions may be included within the toolbox 1430 while still complying with the underlying principles of the invention.

In one embodiment, microprograms and data are transmitted to/from the external memory 1450 of the device via a communication interface 1470 under control of the CPU 1410. Various communication interfaces 1470 may be employed without departing from the underlying principles of the invention including, for example, a Universal Serial Bus ("USB") interface or a serial communication ("serial") interface. The microprograms in one embodiment are comprised of compact, interpreted instructions known as "byte-codes," which are converted into native code by the interpreter module 1420 before being executed by the CPU 1410. One of the benefits of this configuration is that when the microcontroller/CPU portion of the device 100 is upgraded (e.g., to a faster and/or less expensive model), only the interpreter module 1420 and toolbox 1430 of the ROM needs to be rewritten to interpret the currently existing bytecodes for the new microcontroller/CPU. In addition, this configuration allows devices with different CPUs to coexist and execute the same microprograms. Moreover, programming frequently-used routines in the ROM toolbox module 1430 reduces the size of microprograms stored in the external memory 1450, thereby conserving memory and bandwidth over the client link 160 and/or the RF link 220. In one embodiment, new interpreter modules 1420 and/or toolbox routines 1430 may be developed to execute the same microprograms on cellular phones, personal information managers ("PIMs"), or any other device with a CPU and memory.

One embodiment of the ROM 1470 is comprised of interpreted code as well as native code written specifically for the microcontroller CPU 1405. More particularly, some toolbox routines may be written as interpreted code (as indicated by the arrow between the toolbox 1430 and the interpreter module 1420) to conserve memory and bandwidth for the same reasons described above with respect to microprograms. Moreover, in one embodiment, data and microprograms stored in external memory 1450 may be configured to override older versions of data/microprograms stored in the ROM 1470 (e.g., in the ROM toolbox 1430).

As mentioned above, different operational modes may be selected which may correspond to different operational orientations of the data processing device 200. One embodiment of a data processing device 200, illustrated in FIG. 15, includes an operation mode selection module 1500 for selecting between the various operational modes described herein in response different triggering events. The "triggering events" may include the output of one or more operational mode sensors 1502 which automatically detect the correct operating mode for the data processing device 200. For example, one embodiment of the invention includes a switch which is triggered when the display 206 is moved between the first position (FIG. 2) and the second position (FIGS. 7–8). The operation mode selection module 1500 reads the position of the switch to identify the correct operating mode. Various types of switches may be employed while still complying with the underlying principles of the invention including electrical/magnetic switches and/or mechanical switches.

Figure 15:
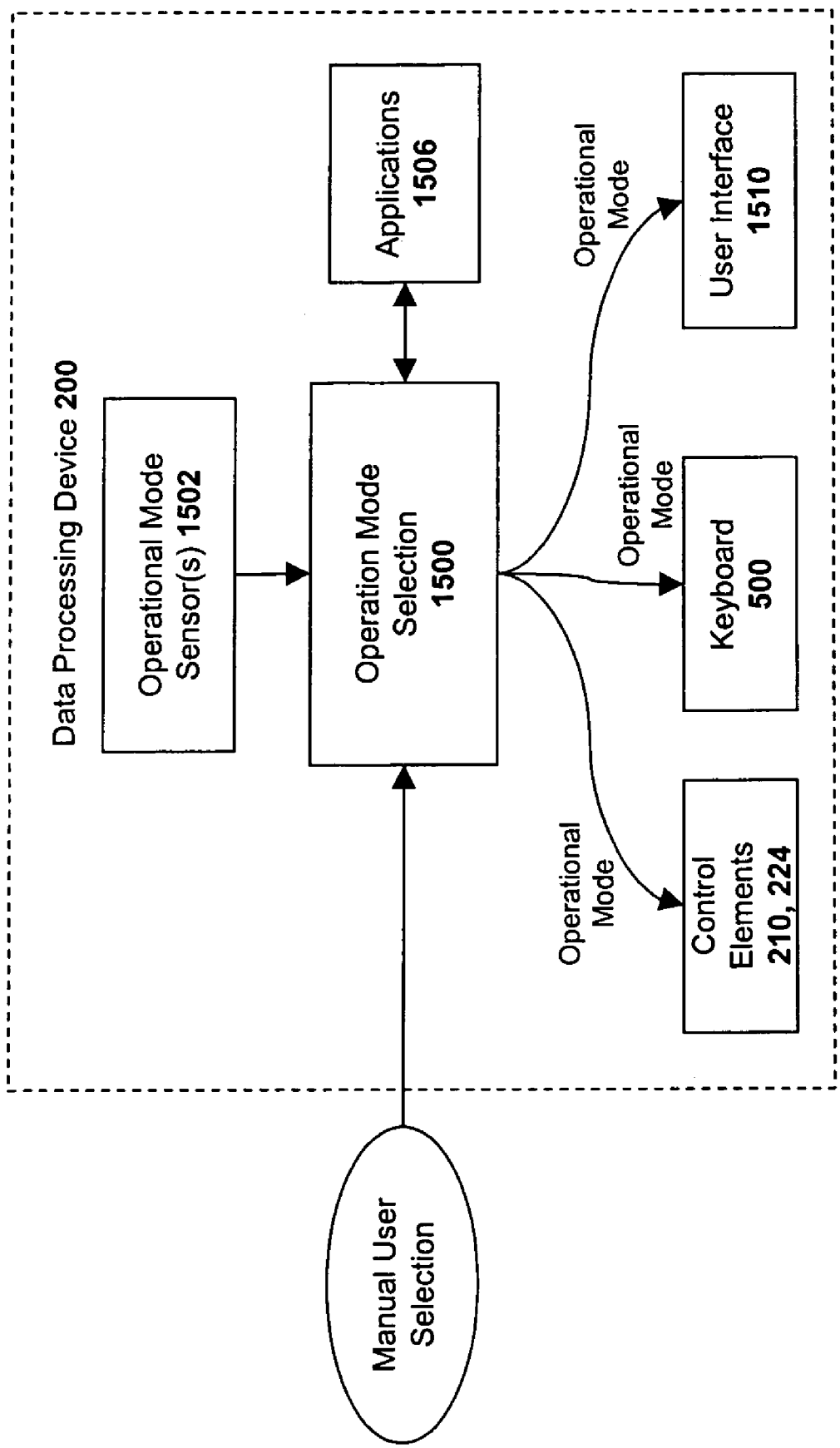
FIG. 15 illustrates an operational mode selection module according to one embodiment of the invention.

In one embodiment, the triggering events also include information related to applications 1506 or other types of program code executed on the data processing device 200. For example, a telephony application may detect incoming calls and provide an indication of the incoming calls to the operation mode selection module 1500, which may then switch to the "telephony" operational mode described above. Similarly, if a telephony-based application is executed (e.g., because the user opens a telephone list), this may indicate that the user is going to use the data processing device 200 as a telephone. Conversely, if the user opens an instant messaging application or Web browser, this may indicate that the user does not wish to use the device as a telephone but, rather, may wish to use the device for text entry. The operation mode selection module 1500 may monitor various aspects of the applications 1506 executed on the data processing device to determine an appropriate operational mode. The user may also manually select an operational mode as indicated in FIG. 15 (e.g., by selecting a particular control element or series of control elements).

In one embodiment, once the operation mode selection module 1500 identifies the correct operational mode, it adjusts the functions associated with the keys of the keyboard 500 and/or control elements 210, 224 as described above. In addition, if the keys/control elements are equipped with different glyphs, as described above, then the glyphs associated with the new functions are highlighted.

In addition, in one embodiment, the operation mode selection module 1500 adjusts the user interface 1510 based on the detected operational mode. As mentioned above, in one embodiment, the orientation of text and images rendered on the display 206 are adjusted based on the current operational mode of the data processing device 200. For example, if the data processing device 200 is in the first operational mode then images may be rendered on the display 206 as illustrated in FIG. 2 (i.e., right-side up when the data processing device 200 is in the orientation shown in FIG. 2). If the data processing device is in the second operational mode, then images may be rendered as illustrated in FIG. 3. Finally, if the data processing device is in the third operational mode (i.e., with the keyboard 500 exposed), then images will be rendered on the display 206 as illustrated in FIG. 8 (i.e., inverted with respect to the orientation shown in FIG. 2). Various other graphical user interface features may be modified within the user interface 1510 based on the detected operational mode of the data processing device 200 (e.g., menu layout, application icons, . . . etc).

Figure 16:
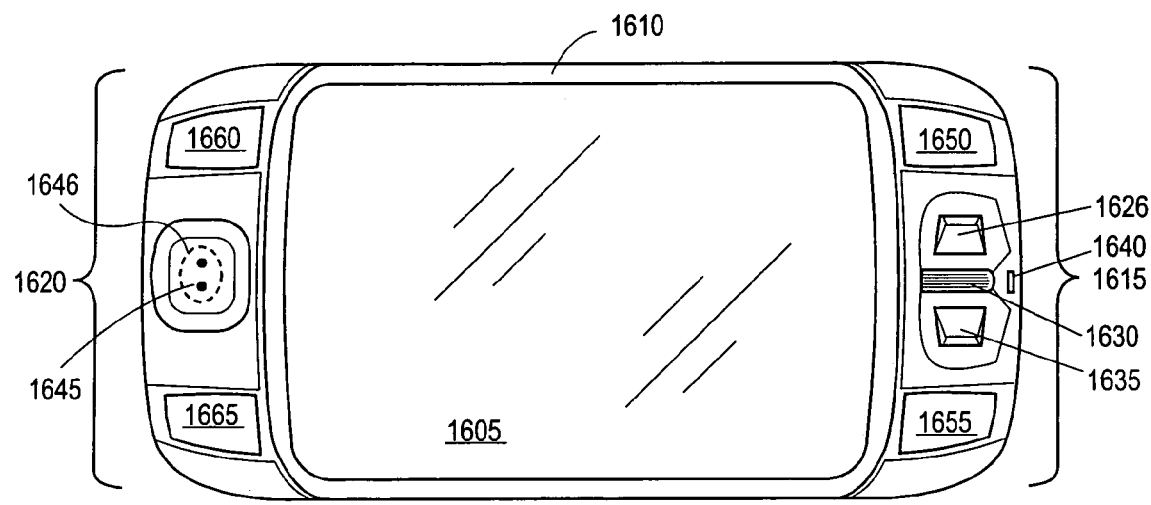
FIGS. 16–17 illustrate another embodiment of the invention having an adjustable display screen.
Figure 17:
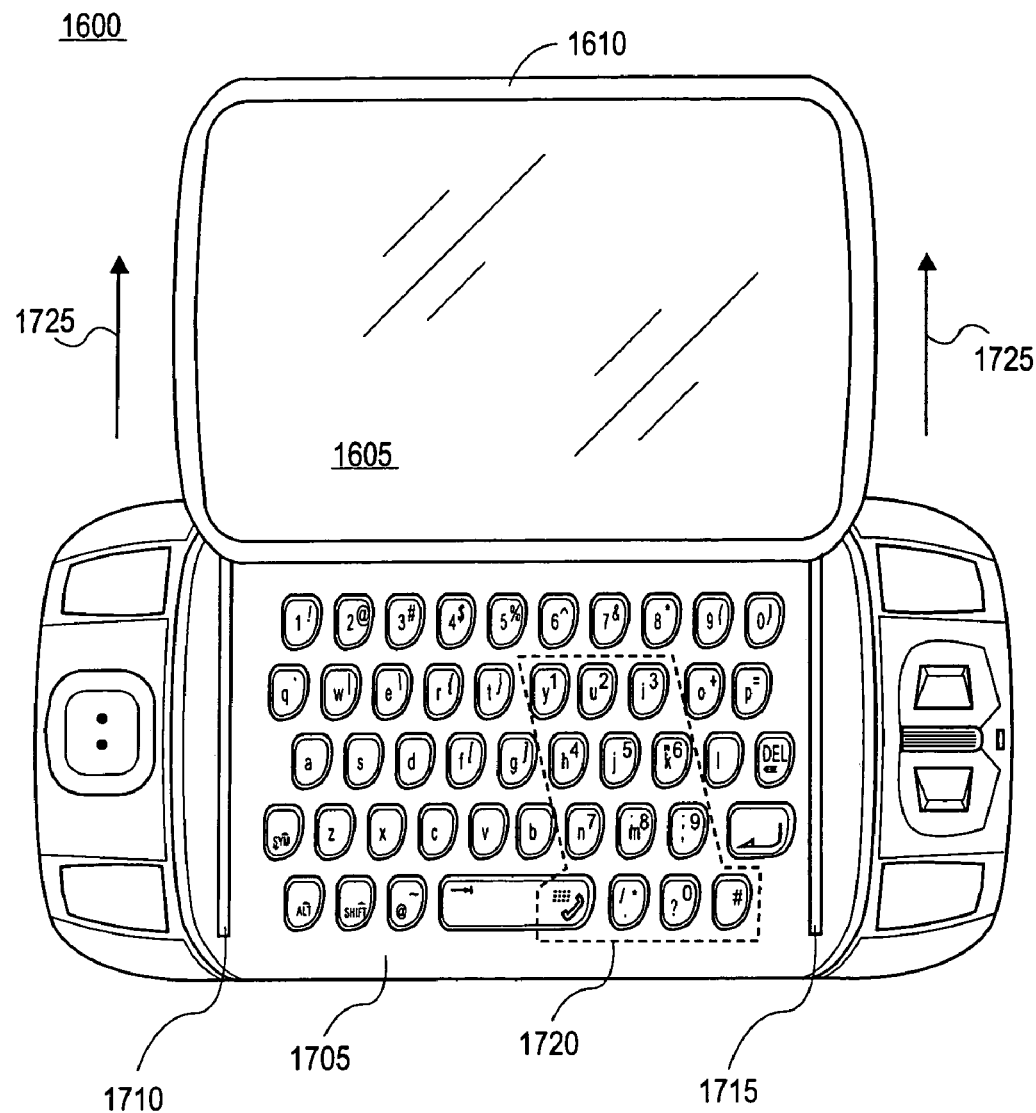

Another embodiment of a data processing device 1600 is illustrated in FIGS. 16–17. The data processing device 1600 includes a display 1610 with a viewable display area 1605 for displaying various types of text and graphics. Moreover, as in the embodiments described above, the data processing device 1600 also includes a plurality of different modes of operation which may be associated with a respective plurality of display and/or device orientations. In the first mode of operation, the display is viewed in a first position, illustrated generally in FIG. 16 in which it covers an alphanumeric keyboard 1705 (illustrated in FIG. 17). In this first position, the display is located flush within the boundary defined by the non-display portions of the data processing device 1600.

By contrast, the display is illustrated in a second position in FIG. 17, in which the alphanumeric keyboard 1705 is exposed and usable for data entry. In one embodiment, the second position of the display corresponds to a second mode of operation as described with respect to other embodiments herein. As shown in FIG. 17, in one embodiment, the display slides from the first position to the second position in a direction substantially parallel to a plane defined by the front surface of the data processing device 1600, as indicated by motion arrows 1725. The sliding motion may be accomplished via pins or posts (not shown) on the backside of the display 1610 that are engaged with tracks 1710, 1715 located on the face of the data processing device 1600 to the left and right of the alphanumeric keyboard 1705, respectively.

Various additional/alternative mechanisms may be used to guide the display from the first position to the second position (and vice versa). For example, in one embodiment, substantially the same mechanism as illustrated in FIGS. 5–9 is employed to rotate the display from the first position to the second position. In addition, as in the embodiments illustrated in FIGS. 5–9, the display 1610 may be configured to lift upward at various different angles in relation to the data processing device, both prior to sliding to the second position and/or after it has reached the second position. The mechanisms illustrated in FIGS. 10 or 11 may be employed to enable this type of motion. Of course, various other well-known techniques may also be employed (e.g., using springs and/or friction).

In one embodiment, the data processing device 1600 includes a first set of control elements 1615 positioned to the right of the display 1610 and a second set of control elements 1620 positioned to the left of the display (i.e., to the right and left while the display in the first position illustrated in FIG. 16). In one embodiment, the first set of control elements 1615 includes a control wheel 1630 positioned between two control buttons 1626, 1635, as illustrated. As in prior embodiments of the invention, the control wheel 1630 may be used to move a cursor control device, highlight bar or other selection graphic on the display to select menu items, program icons and/or other graphical or textual display elements. In one embodiment, the control wheel 1630 is made of clear plastic with an light emitting diode ("LED") or other light source embedded therein.

In one embodiment, the first control button 1626, located above the control wheel 1630, is a "page up" button for generating "page up" control functions. For example, when a word processing document, Web page, email message or other type of document is displayed in the foreground of the display 1610, selection of the first control button 1626 will jump upward through the displayed data/images by a full display screen's Worth of data/images. When navigating through menus, selection of the first control button 1626 may cause a selection element to jump multiple menu items or other graphical elements. Various different/additional "page up" functions may be trigged via the first control button 1626 while still complying with the underlying principles of the invention. The second control button 1635, located below the control wheel 1630, is a "page down" button for generating "page down" control functions (e.g., which operate in the same manner as the "page up" control functions but in the opposite direction).

In one embodiment, a series of additional control elements 1650, 1655, 1660, and 1670 are configured on the data processing device 1600 to provide various additional pre-programmed and/or user-specified control functions. For example, a control element 1650 may be a designated "home" key for jumping to the data processing device's main menu, or performing application-specific functions typically associated with a "home" key (e.g., moving a cursor to the beginning of a line in a word processing document). Control element 1655 may be a dedicated a "menu" key which generates a context-specific menu when selected (e.g., a different menu may be generated based on which application is currently running). Control keys 1660 and 1665 may be designated "jump" keys, allowing the user to easily jump to (i.e., execute) a designated application program. The control elements 1650,1655, 1660 and 1665 may be programmed for various alternate and/or additional functions while still complying with the underlying principles of the invention.

In one embodiment, the second set of control elements includes a directional pad 1645 having an integrated speaker 1646 and/or LED (not shown) (or other light source). In one embodiment, the directional pad 1645 is designed in substantially the same manner as the directional pad described in the co-pending application entitled DIRECTIONAL PAD HAVING INTEGRATED ACOUSTIC SYSTEM AND LIGHTING SYSTEM, Ser. No. 10/718,749, Filed Nov. 21, 2003, which is assigned to the assignee of the present application and which is incorporated herein by reference.

The directional pad 1645 may be used to move a cursor or other selection graphic in any direction on the display to enable selection of menu items, program icons and other graphical or textual display elements. The directional pad 1645 may be made of frosted translucent plastic and may be white in color, although other materials and colors may be used. The LED contained in the directional pad may be a tri-color LED that generates a variety of colors to alert the user when an incoming message has been received. In "telephony mode" (described below), the speaker 1646 contained in the directional pad 1645 enables the user to hear the party on the other end of a call. In addition, a microphone 1640 is configured at the end of the data processing device 1600 opposite the speaker 1646 so that the data processing device 1600 may be held like a mobile phone while in telephony mode (i.e., when the speaker placed next to the user's ear, the microphone is located in the proximity of the user's mouth).

In one embodiment, when in "telephony mode" the functions performed by the various control elements 1615,1620 and/or keys on the keypad 1705 change to designated telephony functions. For example, in the telephony mode of operation, the control button 1626 above the scroll wheel may function as a "call" button with which the user may initiate a telephone call once the number to be called has been entered. The control button 1625 below the scroll wheel 1630 may function as a "hang up" button, with which the user may conclude a telephone call. Similarly, referring to FIG. 17, to simplify numeric data entry when in telephony mode, a designated set of alphanumeric keys 1720 from the keyboard 1705 may change to a numeric keypad (e.g., the 'y' key may change to a '1' key, the 'u' key may change to a '2' key, . . . etc).

In addition, the glyphs on the control elements 1615,1620 and/or keys on the keypad 1705 may change to reflect the change in operation in the same or a similar manner as described in the embodiments above. For example, light emitted by LEDs embedded within the control buttons 1625 and 1626 on either side of the scroll wheel 1630 may be modified to reflect the change in operation in telephony mode. In one embodiment, for example, the "call" and "hang up" glyphs are highlighted on the control buttons 1625 and 1626, in contrast to "page up" and "page down" glyphs, respectively.

In one embodiment, two-color LEDs are employed within the keys of the alphanumeric keyboard 1705. When the data processing device is not in telephony mode, both colors of the two-color LEDs are illuminated under all of the alphanumeric keys 1705, thereby highlighting the standard set of alphanumeric glyphs on the keys. For example, if the two-color LEDs are red and green, the combination will generate an amber color beneath the alphanumeric keys 1705. By contrast, when in telephony mode, only one color of each of the two-color LEDs is illuminated. Moreover, in one embodiment, the one LED is illuminated only beneath each of the designated set of numeric keypad keys 1720 (as opposed to illuminating the one LED beneath each of the entire alphanumeric keyboard 1705). By way of example, if only the green LEDs are illuminated beneath each of the designated set of keys 1720, then the numeric keypad glyphs (i.e., numbered 1–9) will be illuminated with a green color in contrast to the standard alphanumeric glyphs. Various different techniques may be employed to illuminate the numeric keypad glyphs and/or the standard alphanumeric glyphs based on the mode of operation, including those described above with respect to FIGS. 12 and 13 and those described in the co-pending application entitled "A METHOD OF DYNAMICALLY LIGHTING KEYBOARD GLYPHS," mentioned above.

Another embodiment of a data processing device 1800 is illustrated in FIGS. 18*a*, 18*b*, 19 and 20. This embodiment operates in a substantially similar manner to the embodiments depicted in FIGS. 16–17 but includes additional functionality. Specifically, when the data processing device 1800 is in a "telephony mode," a third orientation of the display is available, illustrated generally in FIG. 18*a*, in which a numeric keypad 1820 is exposed. The display 1810 of this embodiment is moveably attached to the numeric keypad 1820. In one embodiment, the backside of the display 1810 includes pins or posts which are engaged with tracks 1825, 1830 located on the face of the numeric keypad 1820, on either side of the keypad keys. The motion of the display 1810 from a position in which it covers the numeric keypad (shown in FIG. 19) to a position in which it exposes the numeric keypad 1820 (shown in FIGS. 18*a–b*) is indicated generally by motion arrows 1840.

Figure 19:
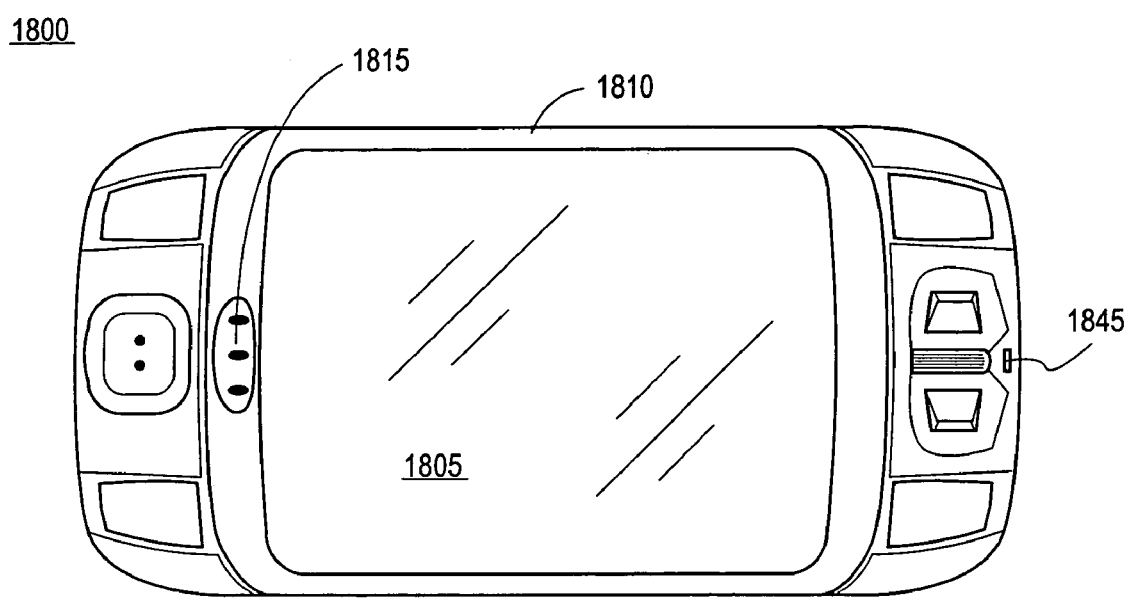

In one embodiment, the data processing device 1800 automatically switches into "telephony mode" in response to the movement of the display from the position shown in FIG. 19 to the position shown in FIG. 18*a–b*, thereby triggering one or more of the telephony mode functions described herein. As in prior embodiments, various different types of switches may be employed to detect the motion of the display relative to the numeric keypad 1820 (e.g., mechanical switches, electromechanical switches).

The plane defined by the display 1810 may move in a substantially parallel or co-planar manner with respect to the plane defined by the numeric keypad 1820 as the display moves from the position in FIG. 19 to the position in FIG. 18*a* (and vice versa). Alternatively, as illustrated in FIG. 18*b*, in one embodiment, the plane defined by the display 1810 moves from a parallel/co-planar position into an angled position with respect to the plane defined by the numeric keypad 1820 (i.e., as the display moves from the position in FIG. 19 to the position in FIG. 18*a–b*). In one embodiment, to enable this movement, only the lower end of the backside of the display 1812 includes pins or posts which are engaged with tracks 1825,1830 located on the face of the numeric keypad 1820. The other end of the display 1813 may move freely around a pivot point defined by the connection between the pins/posts and tracks 1825,1830. In this embodiment, springs (not shown) or a similar torsion mechanism may be employed to apply a force directing the display 1810 back towards the body of the data processing device 1800, as indicated by force/motion arrow 1814.

The embodiment illustrated in FIGS. 18*a–b*, which shows the device from a side view, employs a different mechanism for moving the display from the position in FIG. 19 to the second position shown in FIG. 18*a*. Specifically, this embodiment includes a first pair of linkages 1850 (one of which is shown) rotatably attached to the display 1813 at one end 1856 and rotatably attached to the device/keypad 1820 at the other end 1855 and a second pair of linkages 1851 (only one of which is shown) rotatably attached to the display 1813 at one end 1858 and rotatably attached to the device/keypad 1820 at the other end 1857. In one embodiment, the first set of linkages 1850 are relatively longer than the second set of linkages 1851. As such, when the display is moved from the first position, illustrated in FIG. 18*a* to the second position, illustrated in FIG. 18*b*, it angled with respect to the device/keypad 1820, as shown, thereby fitting around a user's head more accurately during a telephone call.

Regardless of the specific technique used to move the display 1810, once the display is in the position illustrated in FIG. 18*a*, the exposed numeric keypad 1820 is particularly suitable for entering telephone numbers and performing other telephony-based functions. In the embodiment shown in FIG. 18*a*, the numeric keypad includes a standard set of telephone keys, including a send/answer key 1821 for sending/answering calls, an end key 1822 for terminating calls, and a menu key 1823 for generating a telephony-based menu within the viewable area 1805 of the display screen 1810. Various other keys may be employed on the numeric keypad while still complying with the underlying principles of the invention.

Figure 20:
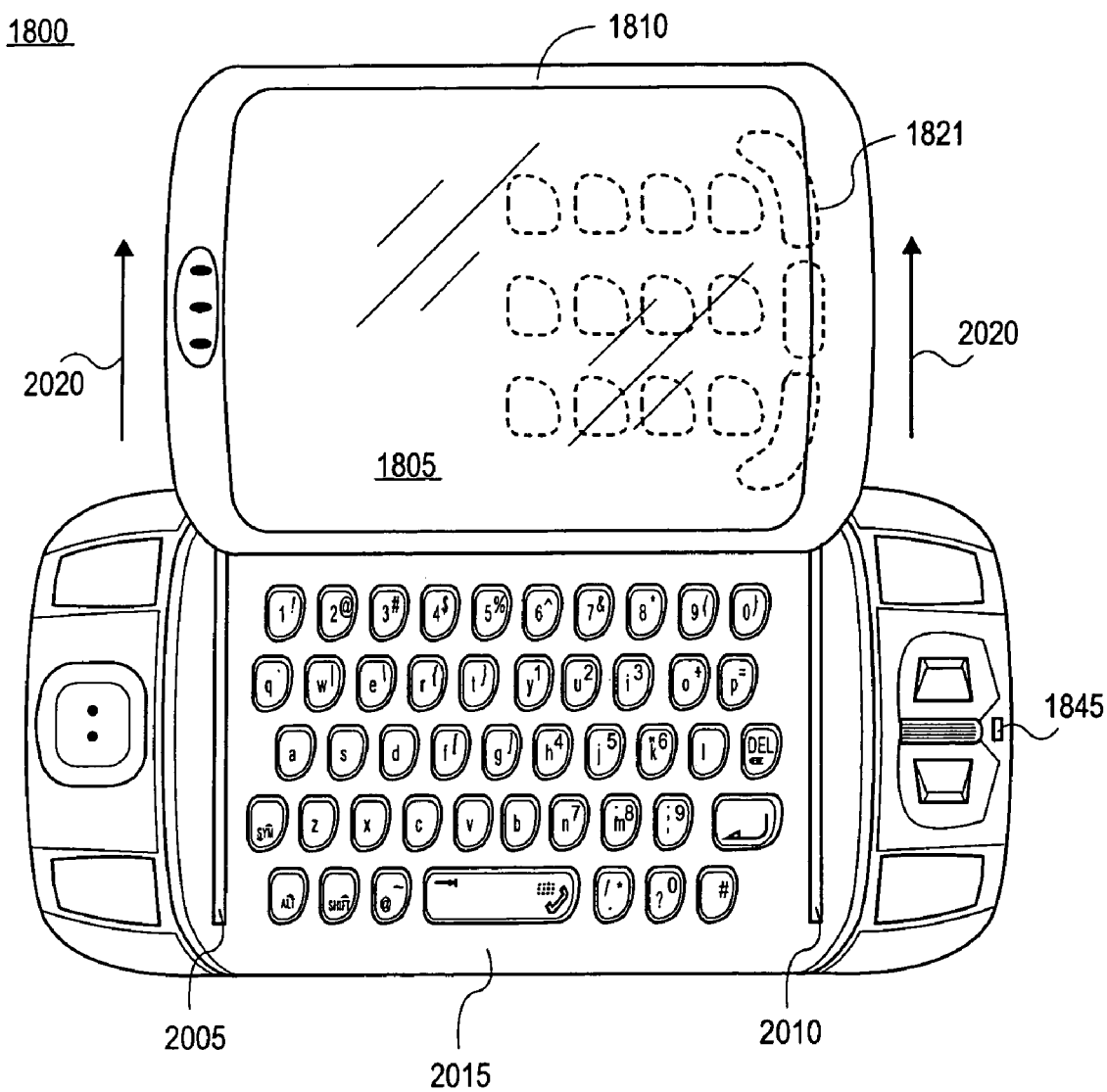

In addition, in one embodiment, the combination of the display 1810 and numeric keypad 1820 are adjustable from the position illustrated in FIG. 19 to the position illustrated in FIG. 20, in which the full alphanumeric keypad 2015 is exposed. As indicated by motion arrows 2020, the direction of the motion of the display 1810 and numeric keypad 1820 is substantially perpendicular to the direction of the motion of the display 1810 in FIGS. 18*a–b*. In one embodiment, to enable this motion, the backside of the numeric keypad 1820 has pins or posts which are engaged with tracks 2005, 2010, located on the face of the alphanumeric keypad 2015. As with the embodiments described above (see, e.g., FIG. 9), the display 1810/keypad 1820 combination may lift upward at various different angles relative to the data processing device 1800, both prior to sliding to the second position and/or after reaching the second position.

In one embodiment, the numeric keypad 1820 is a "passive" keypad which does not include any electrical circuitry. In this embodiment, the numeric keypad 1820 is formed from a thin, plastic material (or similar material) having indications of telephony keys printed thereon. Each of the printed telephony keys is positioned to line up with one or more of the keys on the alphanumeric keyboard 2015 when the keypad 1820 is oriented as illustrated in FIG. 18*a*. Accordingly, when a user selects a particular key from the numeric keypad 1820, a force is translated through the numeric keypad key to one or more keys on the alphanumeric keyboard 2015 directly below the keypad key. Thus, when the data processing device 1800 is in the "telephony mode" illustrated in FIGS. 8*a–b*, each key of the alphanumeric keyboard 2015 positioned beneath a particular numeric keypad key is configured to perform the operation designated on the corresponding keypad key. For example, when in this mode of operation, the DEL key of the alphanumeric keyboard 2015 may perform the MENU function designated by the menu key 1823 of the numeric keypad 1820 (i.e., because the DEL key is positioned beneath the menu key 1823. FIG. 20 shows the silhouette of the numeric keypad 1820 keys beneath the display 1805 when the data processing device is in one of the "data entry" modes.

In one embodiment, an "active" numeric keypad may be employed rather than a "passive" numeric keypad, as described above. The active keypad includes an electrical interface which electrically couples the keypad to the data processing device. Of course, the underlying principles of the invention are not limited to any particular type of numeric keypad.

As shown in FIGS. 18*a*, 19 and 20, a speaker 1815 is configured at the top edge of the display 1810. While in the telephony orientation/mode illustrated in FIGS. 18*a–b*, the data processing device may be held like a mobile phone so that the speaker 1815 is close to the user's ear and the microphone 1845 at the other end of the device is close to the user's mouth. In one embodiment, the speaker 1815 and microphone 1845 may also be used for telephone calls when the display 1810 is in the orientation illustrated in FIG. 19.

In an alternate embodiment (not shown), the display 1810 and numeric keypad may swivel out in unison from the first position to the second position in a fashion similar to that depicted in FIG. 1*c*. In this embodiment, the tracks on the alphanumeric keyboard are unnecessary, as are the pins or posts that slide along those tracks. Instead, the display is pivotally coupled to the data processing device and pivots around a pivot point. As with the embodiment shown in FIG. 20, the display may lift upward at various different angles in relation to the data processing device, both prior to sliding to the second position and/ or after it has reached the second position.

In addition, as illustrated generally in FIGS. 18–20, in one embodiment, when switching between modes, the orientation of images and/or text on the display screen will change. For example, when the data processing device is in telephony mode, as shown in FIG. 18*a*, images and/or text are displayed right-side-up when the first set of control elements is oriented at the bottom of the device. By contrast, when the data processing device is in either of the modes shown in FIGS. 19–20, images and/or text are displayed right-side-up when the first set of control elements is oriented at the right side of the device.

Embodiments of the invention may include various steps as set forth above. The steps may be embodied in machine-executable instructions. The instructions can be used to cause a general-purpose or special-purpose processor to perform certain steps. Alternatively, these steps may be performed by specific hardware components that contain hardwired logic for performing the steps, or by any combination of programmed computer components and custom hardware components.

Elements of the present invention may also be provided as a machine-readable medium for storing the machine-executable instructions. The machine-readable medium may include, but is not limited to, floppy diskettes, optical disks, CD-ROMs, and magneto-optical disks, ROMs, RAMs, EPROMs, EEPROMs, magnetic or optical cards, propagation media or other type of media/machine-readable medium suitable for storing electronic instructions. For example, the present invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

Throughout the foregoing description, for the purposes of explanation, numerous specific details were set forth in order to provide a thorough understanding of the invention. It will be apparent, however, to one skilled in the art that the invention may be practiced without some of these specific details. For example, while the embodiments described above employ specific techniques for highlighting glyphs on keys/control elements, the underlying principles of the invention are not limited to any particular glyph highlighting mechanism. Accordingly, the scope and spirit of the invention should be judged in terms of the claims which follow.

What is claimed is:

1. An apparatus comprising:
    a data processing device having a memory for storing program code and data and a processor for processing the program code and data, and a display for displaying graphical images and text;
    a control wheel rotatably and communicatively engaged with the data processing device, the control wheel causing a graphic element on the display to move in a first direction by a first predefined amount when rotated in a first direction and causing the graphic element to move in a second direction by the first predefined amount when rotated in a second direction;
    a first input button communicatively coupled to the data processing device and positioned directly adjacent to the control wheel in the first direction; and
    a second input button communicatively coupled to the data processing device and positioned directly adjacent to the control wheel in the second direction,
    wherein the first input button causes the graphic element to move in the first direction by a second predefined amount when selected and wherein the second input button causes the graphic element to move in the second direction by a second predefined amount when selected.

2. The apparatus as in claim 1 wherein the graphic element is a graphical cursor.

3. The apparatus as in claim 2 wherein the first predefined amount comprises a single cursor jump and wherein the second predefined amount comprises a full page jump.

4. The apparatus as in claim 2 wherein the first input button is a page up button and the second input button is a page down button, causing the cursor to jump a page up in the first direction or a page down in the second direction, respectively.

5. The apparatus as in claim 1 wherein the control wheel comprises a switch triggered when the control wheel is depressed towards the data processing apparatus.

6. The apparatus as in claim 5 wherein a graphical element highlighted on the display is selected responsive to the switch triggering.

7. The apparatus as in claim 6 wherein the control wheel comprises a light emitting diode ("LED") configured to generate light responsive to control signals generated by the data processing device.

8. The apparatus as in claim 7 wherein the control signals are generated responsive to an incoming telephone call directed to the data processing apparatus.

9. The apparatus as in claim 1 wherein the data processing apparatus includes a first operating mode and a second operating mode;
    wherein in the first operating mode, the first input button causes the graphic element to move in the first direction by a second predefined amount when selected and wherein the second input button causes the graphic element to move in the second direction by a second predefined amount when selected; and
    wherein in the second operating mode, the first input button causes the data processing device to answer an incoming telephone call and/or to initiate an outgoing telephone call when selected, and wherein the second input button causes the data processing device to disconnect a telephone call when selected.

10. The apparatus as in claim 1 further comprising:
an alphanumeric keyboard configured on the data processing device to provide alphanumeric data entry functions.

11. The apparatus as in claim 1 further comprising:
a speaker and microphone configured on the data processing device to provide audio input/output functions.

12. The apparatus as in claim 11 wherein one of the audio input/output functions comprises telephony audio functions.

13. An apparatus comprising:
a data processing device having a memory for storing program code and data and a processor for processing the program code and data, and a display for displaying graphical images and text, the display having a top side, a bottom side, a left side, and a right side;
a control wheel rotatably and communicatively engaged with the data processing device, the control wheel causing a graphic element on the display to move in a first direction by a first predefined amount when rotated towards the top side of the display and causing the graphic element to move in a second direction by the first predefined amount when rotated towards the bottom of the display;
a first input button communicatively coupled to the data processing device and positioned directly adjacent to the control wheel on a side of the control wheel positioned towards the top of the display; and
a second input button communicatively coupled to the data processing device and positioned directly adjacent to the control wheel on a side of the control wheel positioned towards the bottom of the display,
wherein the first input button causes the graphic element to move in the first direction by a second predefined amount when selected and wherein the second input button causes the graphic element to move in the second direction by a second predefined amount when selected.

14. The apparatus as in claim 13 wherein the control wheel, first input button and second input button are positioned adjacent to the right side of the display.

15. The apparatus as in claim 13 wherein the graphic element is a graphical cursor.

16. The apparatus as in claim 13 wherein the first predefined amount comprises a single cursor jump and wherein the second predefined amount comprises a full page jump.

17. The apparatus as in claim 15 wherein the first input button is a page up button and the second input button is a page down button, causing the cursor to jump a page up in the first direction or a page down in the second direction, respectively.

18. The apparatus as in claim 13 wherein the control wheel comprises a switch triggered when the control wheel is depressed towards the data processing apparatus.

19. The apparatus as in claim 18 wherein a graphical element highlighted on the display is selected responsive to the switch triggering.

20. The apparatus as in claim 19 wherein the control wheel comprises a light emitting diode ("LED") configured to generate light responsive to control signals generated by the data processing device.

21. The apparatus as in claim 20 wherein the control signals are generated responsive to an incoming telephone call directed to the data processing apparatus.

22. The apparatus as in claim 13 wherein the data processing apparatus includes a first operating mode and a second operating mode;
wherein in the first operating mode, the first input button causes the graphic element to move in the first direction by a second predefined amount when selected and wherein the second input button causes the graphic element to move in the second direction by a second predefined amount when selected; and
wherein in the second operating mode, the first input button causes the data processing device to answer an incoming telephone call and/or to initiate an outgoing telephone call when selected, and wherein the second input button causes the data processing device to disconnect a telephone call when selected.

23. The apparatus as in claim 13 further comprising:
an alphanumeric keyboard configured on the data processing device to provide alphanumeric data entry functions.

24. The apparatus as in claim 13 further comprising:
a speaker and microphone configured on the data processing device to provide audio input/output functions.

25. The apparatus as in claim 24 wherein one of the audio input/output functions comprises telephony audio functions.

26. The apparatus as in claim 13 wherein the first direction is towards the top side of the display and wherein the second direction comprises towards the bottom side of the display.

27. The apparatus as in claim 13 wherein the first direction is towards the right side of the display and wherein the second direction comprises towards the bottom side of the display.

28. An apparatus comprising:
data processing means having a memory for storing program code and data and a processor for processing the program code and data, and a display for displaying graphical images and text;
a rotatable input means rotatably and communicatively engaged with the data processing device, the rotatable input means causing a graphic element on the display to move in a first direction by a first predefined amount when rotated towards the top side of the display and causing the graphic element to move in a second direction by the first predefined amount when rotated towards the bottom of the display;
first input means communicatively coupled to the data processing device and positioned directly adjacent to the control wheel on a side of the control wheel positioned towards the top of the display; and
second input means communicatively coupled to the data processing device and positioned directly adjacent to the control wheel on a side of the control wheel positioned towards the bottom of the display,
wherein the first input means causes the graphic element to move in the first direction by a second predefined amount when selected and wherein the second input means causes the graphic element to move in the second direction by a second predefined amount when selected.

* * * * *